(12) United States Patent
Vrcelj et al.

(10) Patent No.: US 8,249,116 B2
(45) Date of Patent: Aug. 21, 2012

(54) METHODS AND SYSTEMS FOR TIMING ACQUISITION ROBUST TO CHANNEL FADING

(75) Inventors: Bojan Vrcelj, San Diego, CA (US); Krishna K. Mukkavilli, San Diego, CA (US); Raghuraman Krishnamoorthi, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/644,856

(22) Filed: Dec. 22, 2009

(65) Prior Publication Data

US 2010/0246564 A1 Sep. 30, 2010

Related U.S. Application Data

(60) Provisional application No. 61/140,852, filed on Dec. 24, 2008.

(51) Int. Cl.
*H04J 3/06* (2006.01)
*H04J 3/00* (2006.01)
*H04B 7/212* (2006.01)

(52) U.S. Cl. ........ 370/508; 370/337; 370/347; 370/442; 370/512

(58) Field of Classification Search .................. 370/336, 370/337, 345, 347, 442, 503, 508–512
See application file for complete search history.

(56) References Cited

U.S. PATENT DOCUMENTS

| 2007/0211765 A1* | 9/2007 | Vrcelj et al. | 370/503 |
| 2008/0165908 A1* | 7/2008 | Vrcelj et al. | 375/355 |
| 2008/0260008 A1* | 10/2008 | Vrcelj et al. | 375/149 |

FOREIGN PATENT DOCUMENTS

WO 2008086204 7/2008

OTHER PUBLICATIONS

International Search Report—PCT/US2009/069452, International Search Authority—European Patent Office—May 20, 2010.
International Search Report, PCT/US2009/069452, International Searching Authority, European Patent Office, May 28, 2010.
Written Opinion, PCT/US2009/069452, International Searching Authority, European Patent Office, May 28, 2010.

\* cited by examiner

*Primary Examiner* — Ronald Abelson
(74) *Attorney, Agent, or Firm* — Ryan N. Farr

(57) ABSTRACT

The embodiments provide mechanisms for synchronizing a receiver with OFDM pilots that are robust in the presence of channel fading conditions. In addition to using instantaneous channel estimate values to locate the first arriving path and last arriving path, the methods calculate time-domain averaged channel estimate values and use those averaged values to determine an average first arriving path and last arriving path. A combination of the instantaneous first arriving path and last arriving path and the average first arriving path and last arriving path may then be used to determine the delay spread and calculate a timing offset to be applied in timing synchronization. The various embodiments introduce improvements under channel fading conditions. Time-domain averaging may be embodied in a flexible DSP processor, or implemented in hardware and/or software. Using both instantaneous and time-averaged channel estimates greatly improves the robustness of time synchronization under channel fading conditions.

65 Claims, 12 Drawing Sheets

METHODS AND SYSTEMS FOR TIMING ACQUISITION ROBUST TO CHANNEL FADING

RELATED APPLICATIONS

This application claims the benefit of priority to U.S. Provisional Patent Application Ser. No. 61/140,852 entitled "Timing Acquisition Robust to Channel Fading," filed on Dec. 24, 2008, the entire contents of which are hereby incorporated by reference.

BACKGROUND

In the field of wireless communications, time acquisition using Time-Domain Multiplexed (TDM) pilot symbols is often used to acquire timing information in wireless communications systems. Known TDM pilot based timing acquisition methods, such as those relying on a time domain channel estimate, are susceptible to fading, noise and interference. Thus, TDM timing acquisition algorithms that are more robust in the presence of severe fading, thermal noise and other sources of interference can improve wireless receiver performance.

SUMMARY

The various embodiments provide mechanisms for synchronizing a receiver with orthogonal frequency domain modulation (OFDM) signals that are robust in the presence of channel fading conditions by including time-domain averaging of the timing information, or of the channel impulse responses derived using the pilot symbols. Dedicated time domain multiplexed (TDM) pilot symbols may be used in OFDM waveforms to assist with initial coarse timing acquisition (or frame timing), and fine timing acquisition (FTA), providing symbol timing. A dedicated TDM pilot 2 symbol may be used to obtain a channel impulse response, which may be used to derive the fine timing corrections to coarse timing In addition to using instantaneous channel estimates to locate the first arriving signal replica (also known as first arriving path, "FAP") and the last arriving signal replica (also known as last arriving path, "LAP"), the methods, circuits and devices calculate time-domain averaged channel estimates and use those averaged values to determine average FAP and LAP values. A combination of the instantaneous first arriving path and last arriving path and the average first arriving path and last arriving path may then be used to determine the average delay spread and to calculate a robust timing offset to be applied in timing synchronization. This robust timing offset may be used to adjust the symbol timing after the fine timing acquisition (FTA) when there is a sudden change in timing parameters as may occur in the presence of signal fading. Further, timing information and delay spread information obtained during fine timing acquisition may be used as a guide, or a starting point for timing synchronization adjustments applied during data decoding. This may be done since the dedicated pilot symbol used for FTA provides better time resolution and minimizes the probability of channel impulse response aliasing due to under-sampling in the frequency domain. For reasons mentioned, it is often beneficial to employ time domain averaging methods especially on the channel estimates obtained during FTA, as the resulting timing corrections and delay spread estimates may influence the operation and outcome of multiple timing synchronization adjustments applied during data decoding, also known as data mode time tracking (DMTT) corrections. Using both instantaneous and averaged time domain channel estimates to form a decision about the signal propagation and timing parameters during FTA greatly improves the robustness of time synchronization under channel fading conditions.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
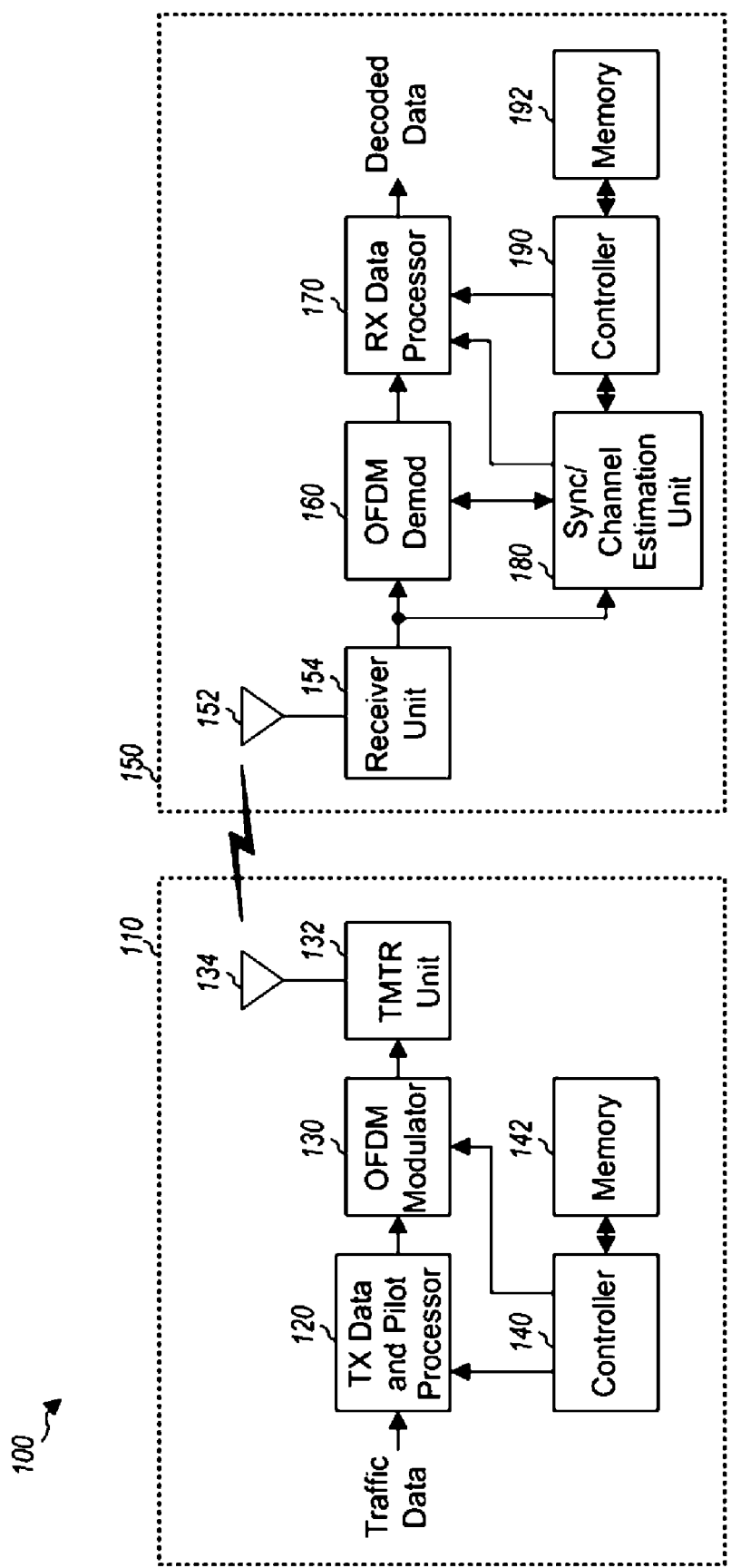
FIG. 1 is a block diagram of an embodiment of a base station and a wireless receiver in an orthogonal frequency division multiplexing (OFDM) system.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

The notion of timing synchronization with periodic referral to time domain multiplexed pilots (TDM pilots) was introduced with the goal of increasing the dynamic range of ordinary data mode time tracking (DMTT) through the use of long TDM pilots. TDM pilots are highly sensitive to channel fading. The various embodiments introduce improvements in the methods and circuits for tracking TDM pilots which provide improved performance under channel fading conditions. The improvements are achieved by introducing time-domain averaging of TDM-pilot based channel estimates. In one embodiment, this averaging may be embodied in a flexible DSP processor. In a further embodiment, this additional averaging may be implemented in hardware and/or software. The averaging and timing decisions may be based on both instantaneous and past channel realizations, thereby greatly improving robustness under channel fading conditions.

The various embodiment systems pertain to hardware, software, and/or firmware implementation of an additional block for timing synchronization in an OFDM-based communication system. The various embodiments may be used in communication systems using different communication technologies in which the transmit waveform uses pilot symbols for frame synchronization and receivers require relatively precise synchronization with the transmit waveform on the level of data symbols.

The various embodiment methods and systems relate to synchronization in an information transport system using orthogonal frequency division multiplexing (OFDM). The OFDM system may use a transmission structure whereby data is transmitted in frames, with each frame having a particular time duration. Different types of data (e.g., traffic/packet data, overhead/control data, TDM pilots, etc.) may be sent in different parts of each frame. The term "pilot" as used herein refers to data and/or transmissions that are known in advance by both the transmitter and a receiver, and therefore can be recognized by the receiver as communicating predetermined information, such as a timing or synchronization pattern.

As used herein, the terms "receiver device" and "receiver" refer to any one or all of wireless communication receivers configured to receive wireless communication signals transmitted in using OFDM encoding and modulation. Such receiver devices may include mobile multimedia broadcast receivers, cellular telephones, and similar personal electronic devices which include receiver circuitry capable of demodulating OFDM symbols, and a programmable processor and memory.

A receiver configured to receive OFDM signals typically needs to obtain accurate frame and symbol timing in order to properly recover the data sent by the transmitter. For example, the receiver may need to know the start of each frame in order to properly recover the different types of data sent in the frame. The receiver often does not know the time at which each OFDM symbol is sent by the transmitter nor the propagation delay introduced by the communication channel. The receiver would then need to ascertain the timing of each OFDM symbol received via the communication channel in order to properly perform the complementary OFDM demodulation on the received OFDM symbol.

The term "timing synchronization" in this disclosure refers to a general process performed by the receiver to obtain frame and symbol timing. The term timing acquisition in this disclosure refers to a general process performed by the receiver to obtain frame timing using pilot symbols. The receiver may also perform other tasks, such as frequency error estimation and channel estimation. Quickly performing synchronization may ease acquisition of the signal. Timing synchronization may occur at different times to improve timing and correct for changes in the channel. In various implementations, timing acquisition is followed by numerous time tracking or data mode time tracking (DMTT) corrections, which may be based on channel estimates obtained from a limited number of frequency domain multiplexed (FDM) pilots embedded in the OFDM waveform among the data subcarriers. Because of the limited number of FDM pilots, the channel estimates obtained with their use are often short and thus subject to time-aliasing. A method of resolving timing ambiguities resulting from time-aliasing is based on using the timing acquisition periodically as a safe starting point, and adjusting the timing slightly during DMTT corrections around this starting point. Given the importance of accurate and robust timing decisions made during timing acquisition, a robust method is described and claimed which relies on both the instantaneous and averaged channel estimates to identify the timing offsets needed (looking at the trends in the channel behavior), as well as the delay spread on average.

Synchronization using time division multiplexed pilots in the broadcast system is described in commonly-owned U.S. Patent Application Publication No. 2009/0190675 entitled "Synchronization in a Broadcast OFDM System Using Time Division Multiplexed Pilot," filed on Oct. 31, 2007, the entire contents of which are incorporated herein by reference. Time tracking using assistance from TDM pilots is described in commonly-owned U.S. Patent Application Publication No. 2008/0260008 entitled "Methods and Apparatus for Time Tracking Using Assistance from TDM Pilots in a Communication Network," filed on Jan. 7, 2008, the entire contents of which are incorporated herein by reference. Methods for synchronizing timing of receivers to OFDM signals using TDM pilots including fine timing estimates are described in commonly-owned U.S. Patent Application Publication No. 2006/01221810 entitled "Fine Timing Acquisition," filed on Mar. 8, 2006, the entire contents of which are incorporated herein by reference.

The various embodiments disclose methods and system for improving the robustness of the acquisition of the TDM pilot-2 in the presence of channel fading, which is applicable to synchronizing timing of a receiver to a received orthogonal frequency division multiplexing (OFDM) signal. In addition to using instantaneous channel estimates to locate the first arriving signal replica (also known as first arriving path, "FAP") and the last arriving signal replica (also known as last arriving path, "LAP"), the methods, circuits and devices calculate time-domain averaged channel estimates and use those averaged values to determine average FAP and LAP values. A combination of the instantaneous first arriving path and last arriving path and the average first arriving path and last arriving path may then be used to determine the average delay spread and to calculate a robust timing offset to be applied in timing synchronization. This robust timing offset may be used to adjust the symbol timing after the fine timing acquisition (FTA) when there is a sudden change in timing parameters as may occur in the presence of signal fading.

Timing information and delay spread information obtained during fine timing acquisition may be used as a guide, or a starting point for timing synchronization adjustments applied during data decoding. This may be done since the dedicated pilot symbol used for FTA provides better time resolution and minimizes the probability of channel impulse response aliasing due to under-sampling in the frequency domain. For reasons mentioned, it is often beneficial to employ time domain averaging methods especially on the channel estimates obtained during FTA, as the resulting timing corrections and delay spread estimates may influence the operation and outcome of multiple timing synchronization adjustments applied during data decoding. Using both instantaneous and averaged time domain channel estimates to form a decision about the signal propagation and timing parameters greatly improves the robustness of time synchronization under channel fading conditions.

As has been described in the above incorporated applications, a first timing acquisition may be performed with a first received time division multiplexed (TDM) pilot (referred to as the TDM pilot-1) to determine a course timing estimate of the received OFDM signal. A second timing acquisition is performed with a second TDM pilot (TDM pilot-2) to determine a fine timing estimate for an OFDM symbol of the received OFDM signal. The first TDM pilot may be received before the second TDM pilot and the fine timing estimate may be a refinement of the course timing estimate. In the second timing acquisition step, the accumulated energy of channel taps over a detection window is determined and a trailing edge of the accumulated energy curve is detected. In an alternative embodiment, one or both of the leading and trailing edges may be determined in the second timing acquisition step. The symbol boundary location may be adjusted according to the second timing acquisition step.

Methods and systems for timing synchronization after the initial acquisition in an OFDM system are described in the above-incorporated pending U.S. Applications. The result of the initial timing acquisition, based on time division multiplexed (TDM) pilot-1 processing, is a coarse timing estimate. The coarse timing estimate may provide the information about the beginning of a superframe as well as a coarse estimate of the beginning of the TDM pilot 2 symbol. With further timing estimation using the TDM pilot-2 structure, the receiver may estimate the exact starting position of the subsequent OFDM symbols. This step is called fine timing acquisition (FTA). A side product of this computation is a channel estimate which may be used to initialize the channel estimation block. As another side product of FTA, a channel delay spread may be obtained. The information about the channel delay spread may then be used during data mode time tracking as a guideline of the expected occupancy of the signal taps in the data channel estimates, as well as to provide an upper bound on the amount of timing correction that may be applied during DMTT without causing the time-aliasing of the future data channel estimates.

FIG. 1 illustrates a block diagram of a base station 110 and a wireless receiver 150 in an OFDM system 100 according to an embodiment. The base station 110 is generally a fixed station and may also be referred to as a base transceiver system (BTS), an access point, or by some other term. Wireless receivers 150 may be fixed or mobile, and may also be referred to as a user terminal, a mobile station, or by some other term. The wireless receiver 150 may also be a portable unit, such as a cellular phone, a handheld device, a wireless module, a personal digital assistant (PDA), a television receiver, and so on.

At the base station 110, a transmitter (TX) data and pilot processor 120 receives different types of data (e.g., traffic/packet data and overhead/control data) and processes (e.g., encodes, interleaves, and symbol maps) the received data to generate data symbols. As used herein, a "data symbol" means a modulation symbol for data, a "pilot symbol" means a modulation symbol for a pilot, and a "modulation symbol" means a complex value for a point in a signal constellation for a modulation scheme (e.g., M-PSK, M-QAM, and so on). The pilot processor 120 also processes pilot data to generate pilot symbols and provides the data and pilot symbols to an OFDM modulator 130.

The OFDM modulator 130 multiplexes the data and pilot symbols onto the proper subbands and symbol periods and further performs OFDM modulation on the multiplexed symbols to generate OFDM symbols, as described below. A transmitter (TMTR) unit 132 converts the OFDM symbols into one or more analog signals and further conditions (e.g., amplifies, filters, frequency upconverts, etc.) the analog signal(s) to generate a modulated signal. The base station 110 then transmits the modulated signal from an antenna 134 to wireless receivers 150 in the OFDM system 100.

At the wireless receiver 150, the transmitted signal from the base station 110 is received by an antenna 152 and provided to a receiver unit 154. The receiver unit 154 conditions (e.g., filters, amplifies, frequency downconverts, etc.) the received signal and digitizes the conditioned signal to obtain a stream of input samples. An OFDM demodulator 160 performs OFDM demodulation on the input samples to obtain received data and pilot symbols. The OFDM demodulator 160 also performs detection (e.g., matched filtering) on the received data symbols with a channel estimate (e.g., a frequency response estimate) to obtain detected data symbols, which are estimates of the data symbols sent by the base station 110. The OFDM demodulator 160 provides the detected data symbols to a receive (RX) data processor 170.

A synchronization/channel estimation unit (SCEU) 180 receives the input samples from the receiver unit 154 and performs synchronization to determine frame and symbol timing, as described below. The SCEU 180 also performs data mode time tracking. During data demodulation, the SCEU 180 derives the channel estimate using frequency domain multiplexed pilots embedded among data subcarriers. The SCEU 180 provides the symbol timing and channel estimate to the OFDM demodulator 160 and provides the frame timing to the RX data processor 170 and/or a controller 190. The OFDM demodulator 160 uses the symbol timing to perform OFDM demodulation and uses the channel estimate to perform detection on the received data symbols.

The RX data processor 170 processes (e.g., symbol demaps, deinterleaves, decodes, etc.) the detected data symbols from the OFDM demodulator 160 and provides decoded data. The RX data processor 170 and/or the controller 190 use the frame timing to recover different types of data sent by the base station 110. In general, the processing by the OFDM demodulator 160 and RX data processor 170 is complementary to the processing by the OFDM modulator 130 and TX data and pilot processor 120, respectively, at the base station 110.

The controllers 140, 190 direct operations at the base station 110 and the wireless receiver 150, respectively. The controllers 140, 190 may be processors and/or state machines. Memory units 142, 192 provide storage for program codes and data used by the controllers 140 and 190, respectively. The memory units 142, 192 may use various types of storage medium to store information.

The base station 110 may send a point-to-point transmission to a single wireless receiver, a multi-cast transmission to a group of wireless receivers, a broadcast transmission to all wireless receivers under its coverage area, or any combination thereof. For example, the base station 110 may broadcast pilot and overhead/control data to all wireless receivers 150 under its coverage area. The base station 110 may further single-cast transmit user-specific data to specific wireless receivers 150, multi-cast data to a group of wireless receivers 150, and/or broadcast data to all wireless receivers 150 in various situations and embodiments.

Figure 2A:
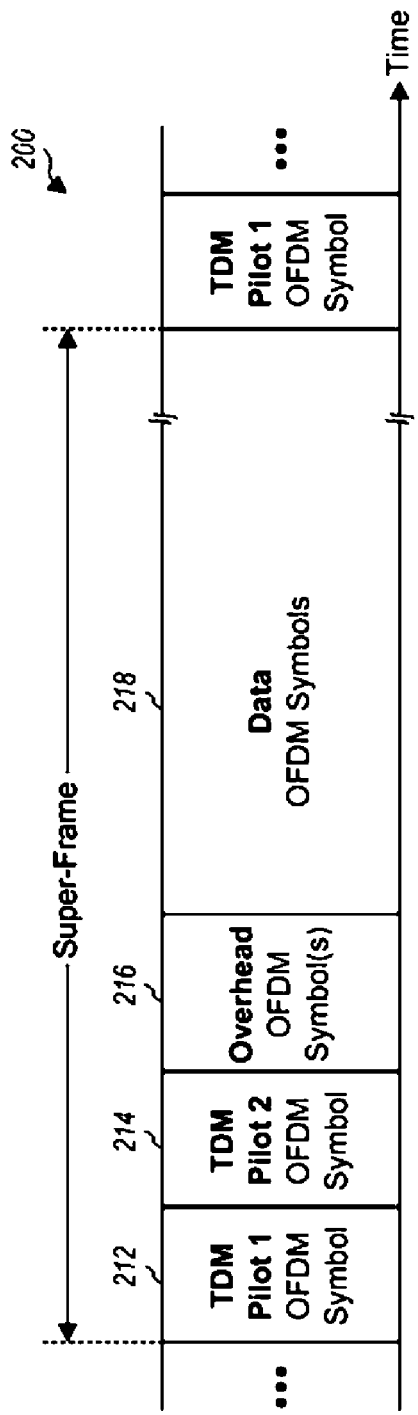
FIGS. 2A and 2B are block diagrams of embodiments of a super-frame structure for the OFDM system.

FIG. 2A illustrates a diagram of a super-frame structure 200 that may be used for an OFDM system 100 according to an embodiment. Data and pilots may be transmitted in super-frames, with each super-frame having a predetermined time duration. A super-frame may also be referred to as a frame, a time slot, or some other terminology. In this embodiment, each super-frame includes a TDM pilot-1 field 212 for a first TDM pilot, a TDM pilot-2 field 214 for a second TDM pilot, an overhead field 216 for overhead/control data, and a data field 218 for traffic/packet data.

The four fields 212 through 218 are time division multiplexed in each super-frame such that only one field is transmitted at any given moment. The four fields are also arranged in the order shown in FIG. 2 to facilitate synchronization and data recovery. Pilot OFDM symbols in pilot fields 212 and 214, which are transmitted first in each super-frame, may be used for detection of overhead OFDM symbols in field 216, which is transmitted next in the super-frame. Overhead information obtained from field 216 may then be used for recovery of traffic/packet data sent in data field 218, which is transmitted last in the super-frame. Moreover, the symbol timing obtained using pilot OFDM symbols in pilot fields 212 and 214, may be used as a starting point for decoding the overhead OFDM symbols in field 216, and traffic OFDM symbols in field 218.

In an embodiment, the TDM pilot-1 field 212 carries one OFDM symbol for the TDM pilot 1, and the TDM pilot-2 field 214 carries one OFDM symbol for the TDM pilot 2. In general, each field may be of any duration, and the fields may be arranged in any order. TDM pilots 1 and 2 are broadcast periodically in each frame to facilitate synchronization by the wireless receivers. The overhead field 216 and/or data field 218 may also contain pilot symbols that are frequency division multiplexed with data symbols, as described below.

The OFDM system 100 has an overall system bandwidth of BW MHz, which is partitioned into N orthogonal subbands using OFDM. The spacing between adjacent subbands is BW/N MHz. Of the N total subbands, M subbands may be used for pilot and data transmission, where M<N, and the remaining N−M subbands may be unused and serve as guard subbands. In an embodiment, the OFDM system uses an OFDM structure with N=4096 total subbands, M=4000 usable subbands, and N−M=96 guard subbands. In general, any OFDM structure with any number of total, usable, and guard subbands may be used for the OFDM system.

The TDM pilots 1 and 2 may be designed to facilitate synchronization by the wireless receivers in the system. A wireless receiver may use the TDM pilot-1 to detect the start of each frame, obtain a coarse estimate of symbol timing, and estimate frequency error. The wireless receiver may use the TDM pilot-2 to obtain more accurate symbol timing.

Figure 2B:
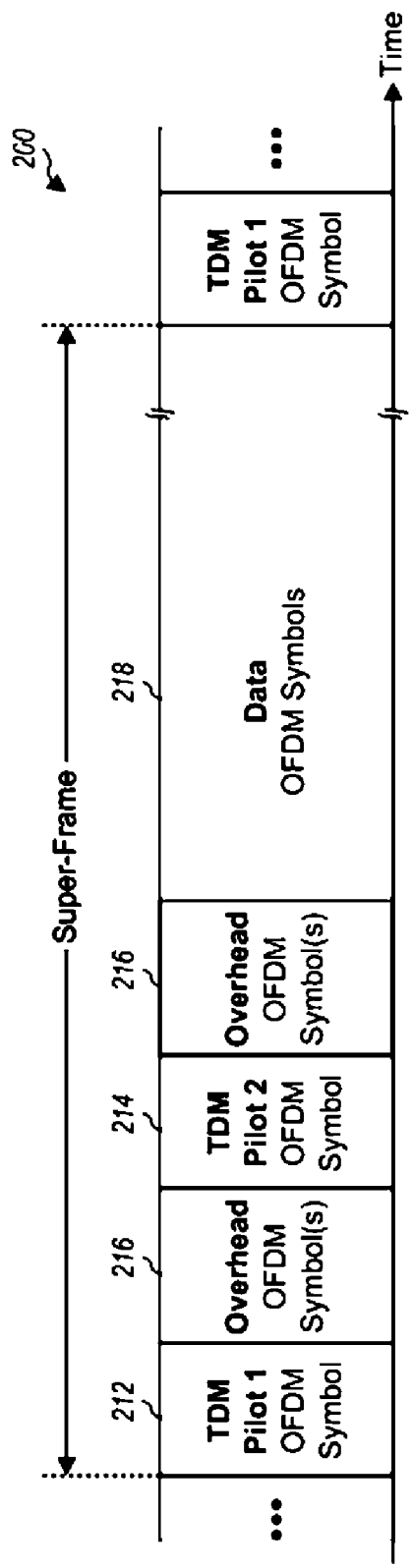

FIG. 2B illustrates a diagram of a super-frame structure 200 that may be used for OFDM system 100 according to an embodiment. This embodiment follows TDM pilot-1 212 with TDM pilot-2 214, with overhead OFDM symbols 216 added in-between. The number and duration of overhead symbols are known such that synchronization to the TDM pilot-1 symbol 212 allows estimating where the TDM pilot-2 symbol will begin.

Figure 3:
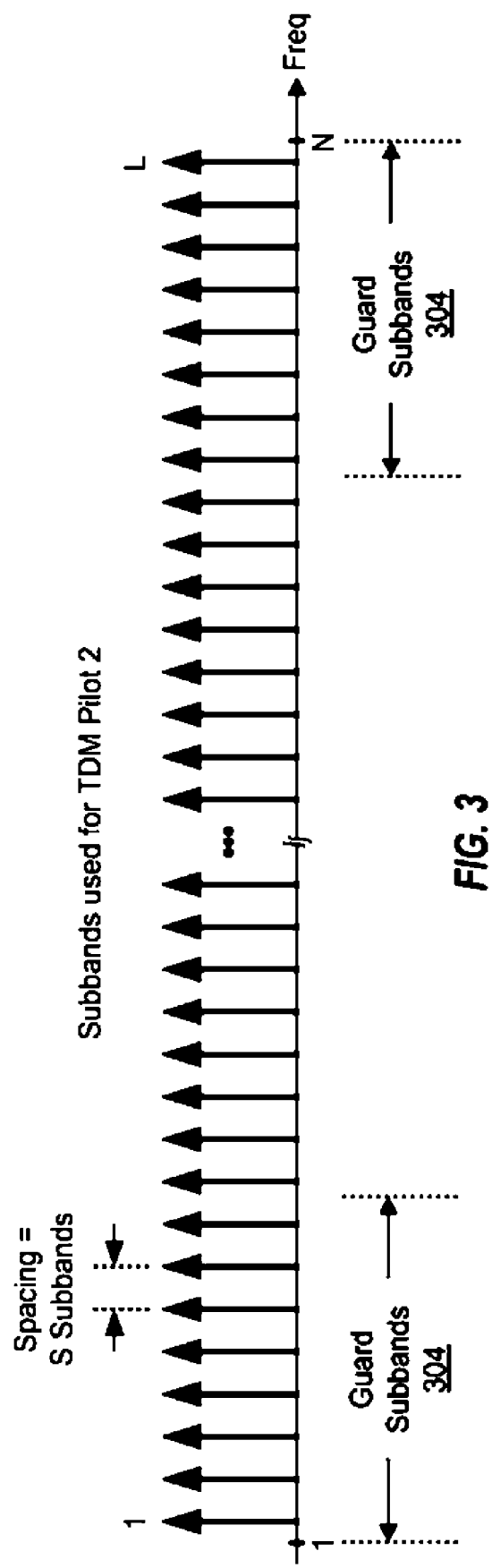
FIG. 3 is a diagram of an embodiment of a frequency-domain representation of a time division multiplexed (TDM) pilot 2.

FIG. 3 illustrates a diagram of the TDM pilot-2 214 in the frequency domain according to an embodiment. Accordingly, the TDM pilot-2 214 comprises L pilot symbols that may be transmitted on L subbands. The L subbands are uniformly distributed across the N total subbands and equally spaced apart by S subbands, where S=N/L. For example, N=4096, L=2048, and S=2. Again, other values may also be used for N, L, and S. This structure for the TDM pilot-2 214 can provide accurate symbol timing in various types of channels including a severe multi-path channel. The wireless receivers 150 may also be configured to: (1) process TDM pilot-2 214 in an efficient manner to obtain symbol timing prior to the arrival of the next OFDM symbol, which is right after TDM pilot-2 in one embodiment, and (2) apply the symbol timing to this next OFDM symbol, as described below. The L subbands for TDM pilot-2 are selected such that S identical pilot-2 sequences are generated for TDM pilot-2 214.

Figure 4:
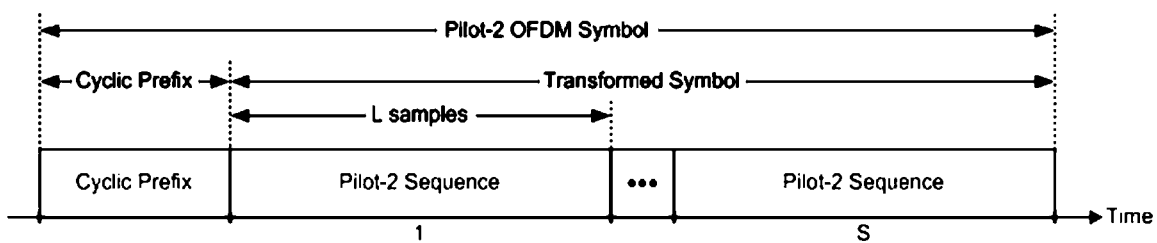
FIG. 4 is a diagram of an embodiment of a time-domain representation of a TDM pilot 2.

FIG. 4 illustrates a diagram of a time-domain representation of TDM pilot-2 according to an embodiment. An OFDM symbol for TDM pilot-2 (or "pilot-2 OFDM symbol") is also composed of a transformed symbol of length N and a cyclic prefix of length C. The transformed symbol for TDM pilot-2 contains S identical pilot-2 sequences, with each pilot-2 sequence containing L time-domain samples. The cyclic prefix for TDM pilot-2 is composed of the C rightmost samples of the transformed symbol and is inserted in front of the transformed symbol. For example, if N=4096, L=2048, S=2, and C—512, then the pilot-2 OFDM symbol contains two complete pilot-2 sequences, with each pilot-2 sequence containing 2048 time-domain samples. The cyclic prefix for TDM pilot-2 would contain only a portion of the pilot-2 sequence.

Figure 5:
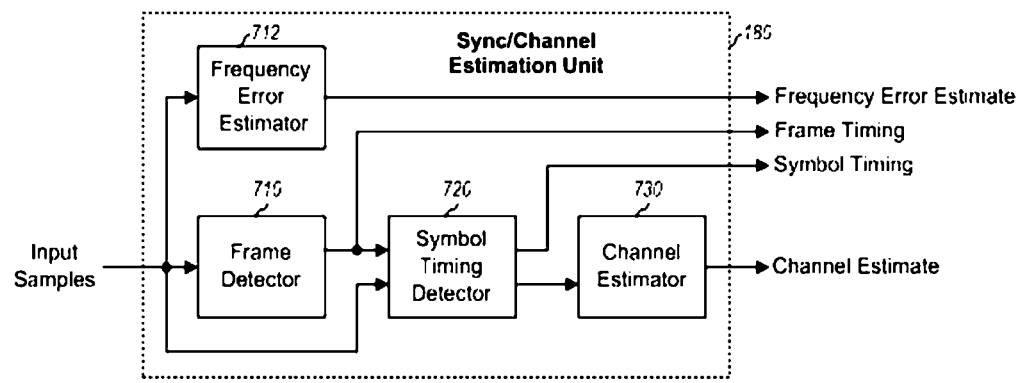
FIG. 5 is a block diagram of an embodiment of a synchronization and channel estimation unit.

FIG. 5 illustrates a block diagram of the SCEU 180 in the wireless receiver 150 according to an embodiment. Within the SCEU 180, a frame detector 710 receives the input samples from receiver unit 154, processes the input samples to detect for the start of each frame, and provides the frame timing. A symbol timing detector 720 receives the input samples and the frame timing, process the input samples to detect for the start of the received OFDM symbols, and provide the symbol timing. The same symbol timing detector 720 may determine symbol timing based on a dedicated TDM pilot 2, or FDP pilots during the decoding of traffic OFDM symbols from field 218. A frequency error estimator 712 estimates the frequency error in the received OFDM symbols. A channel estimator 730 receives an output from the symbol timing detector 720 and derives the channel estimate. The detectors and estimators in the SCEU 180 are described below.

The frame detector 710 performs frame synchronization by detecting the TDM pilot-1 in the input samples from receiver unit 154. For this embodiment, the frame detector 710 is implemented with a delayed correlator that exploits the periodic nature of the pilot-1 OFDM symbol for frame detection.

Figure 6:
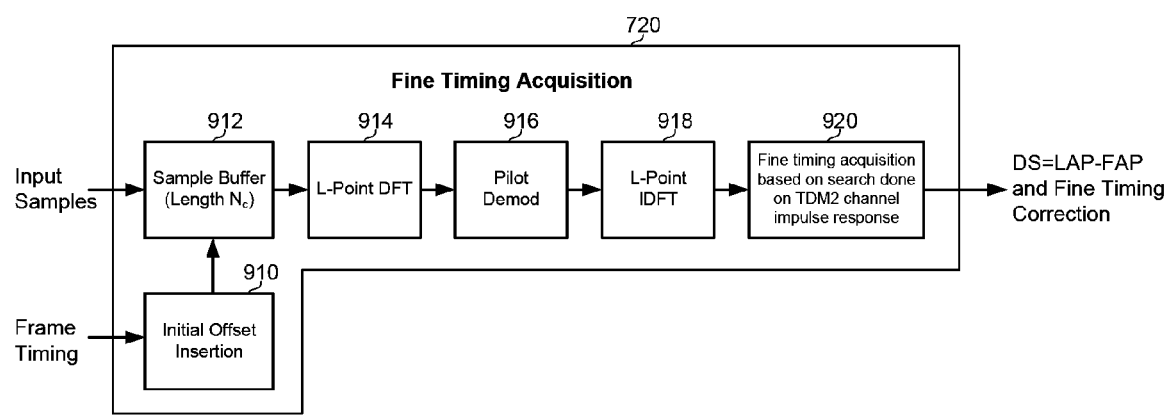
FIG. 6 is a block diagram of an embodiment of a symbol timing detector.

FIG. 6 illustrates a block diagram of a symbol timing detector 720 which may also perform fine timing acquisition detection when performing the fine timing acquisition function according to an embodiment. In this embodiment, the fine timing acquisition detector 720 produce a fine timing correction based on the TDM pilot-2 OFDM symbol. Within fine timing acquisition detector 720, a sample buffer 912 receives the input samples from the receiver unit 154 and stores a "sample" window of L input samples for the TDM pilot-2 OFDM symbol. The start of the sample window is determined by an initial offset insertion unit 910 based on the frame timing from frame detector 710. The sample buffer is then processed by an L-point discrete Fourier transform (DFT) 914 which outputs to a pilot demodulator 916 which outputs to an L-point inverse discrete Fourier transform (IDFT), which outputs to a fine timing acquisition processing module 920 which accomplishes fine timing acquisition based on a search done on TDM pilot-2 channel impulse response, the output of which is a fine timing correction signal.

Figure 7A:
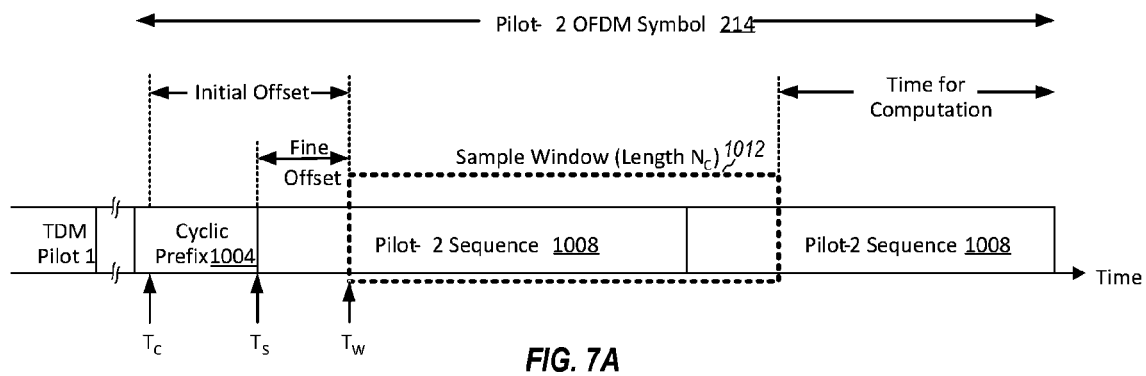
FIGS. 7A to 7C are diagrams that show processing for a TDM pilot-2 OFDM symbol.

FIG. 7A illustrates a timing diagram of the processing for the pilot-2 OFDM symbol according to an embodiment. A frame detector 710 provides the coarse symbol timing (denoted as $T_c$) based on the pilot-1 OFDM symbol even thought the pilot-1 is detected at some later point (denoted as $T_D$). The offset insertion block 910 determines $T_W$ to position the sample window 1012. The pilot-2 OFDM symbol contains S identical pilot-2 sequences where each has a length, L (e.g., two pilot-2 sequences of length 2048 if N=4096 and L=2048). A sample window 1012 of $N_C$ input samples collected by the sample buffer 612 for the pilot-2 OFDM symbol starting at location $T_W$.

The start of the sample window 1012 is delayed by an initial offset $OS_{init}$ from the coarse symbol timing, $T_C$, or $T_W=T_C+OS_{init}$. The initial offset does not need to be especially accurate and is selected to ensure that one complete pilot-2 sequence is collected in sample buffer 612 despite possible errors in the course timing estimate. The initial offset may also be selected to be small enough such that the processing for the pilot-2 OFDM symbol can be completed before the arrival of the next OFDM symbol, so that the symbol timing obtained from the pilot-2 OFDM symbol may be applied to this next OFDM symbol.

Figure 7B:
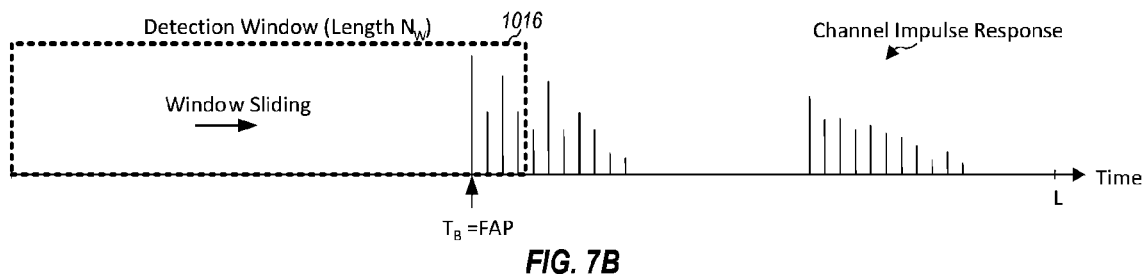

FIG. 7B illustrates an embodiment timing diagram of the L-tap channel impulse response from the IDFT unit 918. The impulse response shows the cyclic shift in the channel estimate, which corresponds to a combined effect of the coarse symbol timing and the deliberately-inserted initial offset. Each of the L taps of the channel impulse response is associated with a complex channel gain at that tap delay. The channel impulse response may be cyclically shifted, which means that the tail portion of the channel impulse response may wrap around and appear in the early portion of the output from IDFT unit 618.

Referring back to FIG. 6, a symbol timing searcher 620 may determine the symbol timing by detecting the beginning of the channel energy shown in FIG. 7B. The fixed point functionality of the symbol timing searcher 620 is divided into two subsections: a block for channel location; and a block for fine timing correction. This detection of the beginning of the channel energy may be achieved by sliding a "detection" window 1016 of length $N_W$ across the channel impulse response, as indicated in FIG. 7B. The detection window size may be determined as described below.

As disclosed in related U.S. patent application Ser. No. 12/644,909, entitled "Methods and Systems for Improved Timing Acquisition for Varying Channel Conditions" which is filed concurrently herewith, the detection window length $N_W$ may be chosen as a tight upper bound on the maximum conceivable channel delay spread, D. In such an embodiment, at each window starting position, the energy of all taps falling within the detection window may be computed to find the tap energy shown as a curve in FIG. 7C. The entire contents of U.S. patent application Ser. No. 12/644,909, entitled "Methods and Systems for Improved Timing Acquisition for Varying Channel Conditions" are hereby incorporated by reference.

Figure 7C:
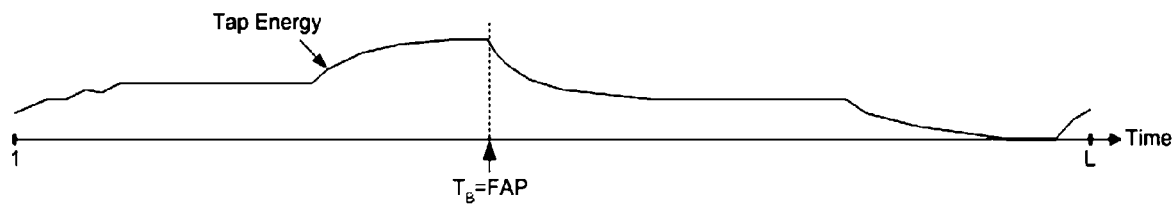

FIG. 7C illustrates a plot of the accumulated energy at different window starting positions according to an embodiment. The detection window is shifted to the right circularly so that when the right edge of the detection window reaches the last tap at index $N_C$, the window wraps around to the first tap at index 1. Thus, energy is collected for the same number of channel taps for each detection window starting position.

The detection window size $N_W$ may be selected based on the maximum possible delay spread expected in the system. The delay spread at a wireless receiver is the time difference between the earliest and latest arriving signal components at the wireless receiver. The delay spread of the system is the largest delay spread among all wireless receivers in the system. If the detection window size is equal to or larger than the delay spread of the system, then the detection window, when properly aligned, will capture all of the energy of the channel impulse response. The detection window size $N_W$ may also be selected in one embodiment to be no more than half of $N_C$ (or $N_W \leq N_C/2$) to avoid ambiguity in the detection of the beginning of the channel impulse response. In another embodiment, the window size $N_W$ may be adapted according to the estimated value of the delay spread D.

In a further embodiment, the fine timing searcher first finds the place $T_M$ where the maximum accumulated energy occurs, and stores this maximum value $E_M$. Next, the accumulated energy curve to the left and to the right of $T_M$ is examined in an effort to locate positions where the accumulated energy drops below the value $(1-b) E_M$, for some predetermined value b, less than one. In other words, the leading edge and the trailing edge of the accumulated energy curve is defined where the accumulated energy falls some percentage (e.g., 5% or 3%) away from its maximum over the detection window 1016. The percentage defines a band around the maximum tap energy position. Entering the band defines the leading edge of the flat portion in the band, $T_L$, while leaving the band defines the trailing edge of the flat portion in the band, $T_T$. The trailing edge may coincide with the position of the first arriving path, while the leading edge may be equal to the last arriving path minus $N_W$. The difference between the leading edge and the trailing edge is equal to $N_W$ minus the delay spread, D. Therefore, delay spread D may be computed as $D=N_W-T_T-T_L$. Once D has been computed, fine timing corrections may be determined so that the channel content remains centered within the cyclic prefix area in the channel estimate during the next OFDM symbol.

In another embodiment, the fine timing searcher may base the decision on the timing correction as a convex combination of the accumulated energy and the finite difference, thus detecting the position of trailing edge only as disclosed in U.S. patent application Ser. No. 12/644,909, entitled "Methods and Systems for Improved Timing Acquisition for Varying Channel Conditions" that is incorporated by reference above.

With respect to previous known implementations of timing acquisition in OFDM systems as briefly described above, the trouble-spot remaining, including the sensitivity to instantaneous fading realizations. Namely, FTA depends entirely on the channel estimates obtained in L-point IDFT unit 918, which operates on instantaneous realizations of the channel affecting the transmitted TDM pilot 2 symbol.

The limiting factor of the symbol-level timing synchronization algorithm in OFDM systems, namely DMTT, is often the length of the channel estimates obtained therein. In particular, when the delay spread of physical channel is more than one-half of the channel estimate used for data demodulation, ambiguities may arise as to the ordering of channel taps or clusters in the estimate. This effect is otherwise known as time-aliasing and is a result of insufficient FDM pilots used to obtain the said channel estimate. These ambiguities in cluster ordering may lead to timing errors. The ambiguities may be avoided only if some further assumptions are made regarding the rate of channel change across frames. The fundamental reason for these ambiguities is the channel aliasing in time domain as a consequence of sub-sampling in the frequency domain. Therefore, the timing errors due to ambiguities may be significantly reduced if the length of the channel estimate $N_C$ is at least twice the maximum anticipated channel delay spread DSmax, in other words if the sampling in frequency domain is dense enough to correspond to the delay spread in time domain.

A way to work around the lack of pilot subcarriers in frequency domain used for channel estimation is to use designated TDM pilots to boot-strap the time tracking. For this reason, TDM-2-assisted time tracking may be used, as disclosed in some of the patent applications incorporated by reference above. Channel estimates derived from TDM pilot-2 typically offer twice the temporal resolution compared to those used in data demodulation. By periodically acquiring the TDM pilot-2, correct initial timing can be reinstated. In between TDM pilot-2 acquisitions, the receiver can exploit the assumption that the timing does not change significantly, and extend the maximum tractable channel delay spread by limiting the number of timing hypotheses to be tested.

Figure 8A:
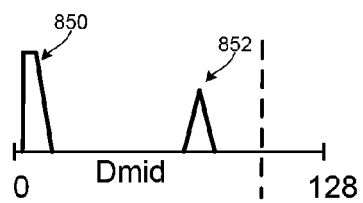
FIGS. 8A-8C illustrate an exemplary early signal content misinterpretation as the late cluster due to fading.
Figure 8B:
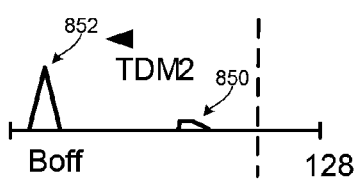
Figure 8C:
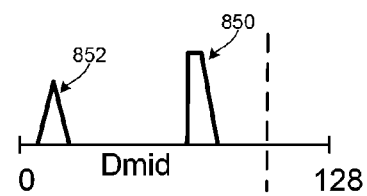

However, even the combined timing synchronization method comprising both frame-level and symbol-level time tracking described above has a weakness. Namely, the assumption that the symbol timing does not change significantly from one TDM pilot-2 acquisition to the next, because this assumption is often violated in the case of multipath fading channels. For example, if the fading realization during TDM pilot-2 acquisition is such that certain early arriving signal paths are missed, it is quite possible that the missed signal paths will re-appear within a few hundred milliseconds. Then, depending on their relative position with respect to the other channel taps, the re-appearing TDM pilot-2 signals may be interpreted as either early or late signal paths in channel estimates that lack temporal resolution. An example of this situation is shown in the sequence of FIGS. 8A-8C, in which an early cluster 850 that would normally appear as shown in FIG. 8A, disappears during the TDM pilot-2 processing in FIG. 8B. In such a situation, the second cluster 852 may be moved to the TDM pilot-2 back-off position by the fine timing acquisition (FTA) algorithm. When the first cluster 850 re-appears later as shown FIG. 8C, that signal may be misinterpreted as a late cluster by the DMTT algorithm. In that event, the symbol timing will remain wrong until the next TDM pilot-2 acquisition.

Even though the performance of symbol-level timing synchronization is more robust to long delay spreads under fading conditions once it is assisted with periodic TDM pilot-2 acquisitions, error bursts can result from erroneous TDM pilot-2 timing decisions based on instantaneous channel estimates. In order to compensate for the sensitivity of the timing scheme to instantaneous channel realizations, the various embodiments provide the following improvements to the overall timing acquisition process.

In the TDM pilot-2-assisted tracking mode, channel estimates obtained as a result of TDM pilot-2 processing may be averaged across multiple superframes so that timing decisions are not dominated by instantaneous measurements which could be thrown off by fading conditions. This calculation provides resistance to fading realizations that occur during the FTA processing. In addition to the ordinary TDM pilot-2 acquisition algorithm, based on first arriving path (FAP), a more reliable first arriving path/last arriving path (FAP/LAP) based algorithm using time-averaged channel estimates may be employed for additional TDM pilot-2 processing as described below. This additional TDM pilot-2 processing ensures that the TDM pilot-2 acquisition is equally sensitive to weak paths as to symbol-level timing.

The TDM pilot-2-assisted tracking mode of timing synchronization, which is also called TDM2-assisted tracking, can exhibit a weakness when it comes to the TDM pilot-2 processing in the presence of fading. This concern may be counter-balanced by introducing time-domain averaging of TDM pilot-2-based channel estimates. Using both instantaneous channel estimates and time-domain averaging of TDM pilot-2 channel estimates to accomplish timing synchronization ensures that the timing synchronization is not dominated by instantaneous channel estimates, which could be thrown off by momentary fading as illustrated in FIGS. 8A-8C. As described below, the time-domain averaging calculates a time-weighted running average of the channel estimates. Using the time-weighted running average channel estimates, time-averaged FAP and time-average LAP locations can be determined using an algorithm similar to that used to determine instantaneous FAP and LAP (i.e., the FAP and LAP determined using the instantaneous channel estimates). Such time-averaged FAP and LAP values can be used to determine an average channel delay spread. Also, the time-averaged FAP and LAP can be used in conjunction with FAP and LAP values determined from instantaneous channel estimates to determine a timing offset that is based both upon the instantaneous and time-averaged FAP/LAP determinations.

Given that the TDM pilot-2 acquisition (frame timing acquisition) should be performed very fast in order to start the processing immediately following data or overhead symbols, the TDM pilot-2 processing may be accomplished in hardware. Such hardware can operate on the instantaneous TDM pilot-2 channel estimates. In other words, the each of the channel estimates h(n) obtained from the FFT may be immediately processed in hardware to determine the FAP and LAP of the TDM pilot-2. The channel estimates may also be averaged within the software, firmware, or in a separate piece of hardware, such as by applying the linear running average calculation in Eq. 1 described below. Then, with both instantaneous and averaged channel estimates determined in parallel, a more reliable "composite" timing offset value may be derived based on these two sources of information as described below with reference to FIG. 9A. This composite timing offset may be applied in addition to the original hardware-based offset. Therefore, the composite timing offsets may be thought of as "corrections" to the instantaneous offsets calculated by the hardware. An example process for applying such corrections to hardware based timing offsets is described below with reference to FIG. 9B.

In addition, to being used to provide a composite timing offset that is less sensitive to fade, the averaged channel estimates may be used to calculate an average delay spread that may be used to directly select the timing synchronization parameters to be used on the symbol-level, and to adjust timing synchronization parameters in order to improve the robustness of the synchronization based on shorter channel estimates.

In another embodiment a traditional FAP-based FTA algorithm may be deployed first, followed by a secondary FTA algorithm based on both FAP/LAP, and using time-averaged channel estimates obtained using TDM pilot 2 symbols. In this embodiment, the first algorithm may be implemented in hardware, may operate on instantaneous TDM pilot 2 channel estimate, and may provide this channel estimate (or its condensed version) to the second algorithm. The second algorithm may be implemented in hardware, firmware, software, or any combination thereof. Within the second algorithm, a time-domain average of the TDM pilot 2 derived channel estimates may be maintained, and this average may be updated with the newly available TDM pilot 2 channel estimate. The second FTA algorithm may then proceed to conduct a FAP/LAP search on both the average and the instantaneous channel estimates. These two sets of FAP/LAP values may be combined to obtain an average robust delay spread, as well as a robust timing offset.

To accommodate sudden fading that could result in the loss of the first arriving path during the FTA process, channel estimates for each of the N chips may be averaged over a number of superframes, such as in a running average. Such averaged channel estimates would not fall below a threshold value in response to a sudden brief fading event unless the fading endured for a long period of time (e.g., when the receiver is stationary in a location of deep fading of the shortest path). Average values may be calculated in any known method of averaging, such as maintaining a running average over a number of superframes. A more direct method of calculating averaged channel estimates is to combine each instantaneous channel estimate h(n) with the existing "averaged channel" $h_{avg}(n)$ in a time-weighted linear equation as follows:

$$h_{avg}(n) = \alpha * h_{avg}(n) + \beta * h(n), \quad \text{Eq. 1}$$

where the combining factors α and β are time-weighting factors.

By varying the α and β factors in Eq. 1, relatively more or less weight may be afforded to the average channel estimate value or the instantaneous channel estimate value. The more weight α applied to the average channel estimates, the more robust the method will be in the presence of fading, but the less responsive the average channel estimate will be to true changes in the location of the FAP (e.g., from movement of the receiver). Conversely, the more weight β applied to the instantaneous channel estimate h(n), the more responsive the average channel estimate will be to changes in the reception conditions, at the expense of reduced ability to follow the long-lasting trends in the channel behavior. Emphasizing the average channel estimates provides benefit in reception locations where fading is likely to occur, such as in dense urban environments. Emphasizing the instantaneous channel estimates provides benefit in situations where the reception conditions are changing, such as when a receiver is rapidly traveling towards or away from a transmitter, such as in an automobile, so that the time of arrival of the pilot symbols is changing relatively rapidly. By combining both the average and the instantaneous FAP/LAP values, the algorithm may reap the benefits from both methods. By choosing an appropriate weight α, the algorithm may be able to follow the long-lasting trends and capture them in $FAP_{avg}/LAP_{avg}$ values. Similarly, the algorithm will also be able to sense a fast change in the channel conditions by estimating $FAP_{inst}/LAP_{inst}$ values. By appropriately combining these estimates, FTA algorithm may make robust timing decisions that minimize the probability of the DMTT algorithm becoming thrown off by inappropriate symbol timing.

The factors α and β in Eq. 1 may be tabulated inside the firmware or software, depending on the implementation. In an embodiment, the factors α and β may be established by the service providers to reflect the nature of their service areas, such as being included as part of the initialization software build or configuration parameters stored in memory. For example, service providers may choose to emphasize the average channel estimate factor α for city coverage areas (where fading will be a common occurrence but users are less likely to traveling rapidly) and emphasize the instantaneous channel estimate factor β in rural coverage areas (where fading is less of an issue and users are more likely to travel rapidly in automobiles).

The factors α and β in Eq. 1 may also be adjusted or calculated in response to different operating conditions, depending on the implementation. In an embodiment, the relative emphasis applied to the average or instantaneous channel estimate in Eq. 1 may depend upon the time duration since the previous $h_{avg}(n)$ update. For example, if the preceding update of $h_{avg}(n)$ was accomplished just a few seconds before a current calculation, more emphasis may be applied to the average channel estimate weighting factor α since the receiver device is unlikely to have traveled to a reception area where the reception characteristics have changed significantly, so the average channel estimate is likely to be representative of the actual conditions. On the other hand, if significant time (e.g., minutes or hours) has transpired since the last update, the instantaneous channel estimate weighting factor β may be emphasized (i.e., increased in value) since the location of the receiver, and thus the reception conditions may have changed such that the instantaneous measurement may be more representative of the actual conditions. In a further embodiment, other factors may be considered in setting the relative weights α and β applied to the average and instantaneous channel estimates, including, for example, detected motion of the receiver device (e.g., from a GPS sensor or a trend in changes of the pilot delay time), recent history of variability or rate-of-change of the average channel estimate, geographic location (e.g., as may be recorded in memory based upon previous calculations in particular GPS coordinate locations or base station identifiers), etc. In such embodiments, the values (α,β) may calculated by an algorithm based on operating conditions, obtained from memory and modified by an algorithm based upon operating conditions, selected from a table of alternative values based upon operating conditions (e.g., in a table lookup process), received from an external source such as in an over-the-air update from a broadcaster, and combinations of these alternative methods.

In an embodiment, the index n may need to be pre-corrected for the total accumulated timing offset applied in hardware between two consecutive channel averaging instances. As described below with reference to FIG. 9A, the accumulated timing offset can be a combination of the FTA timing offsets applied during the previous update, and the DMTT timing corrections that were made in between In an embodiment, the instantaneous channel estimates used in the channel estimate averaging may be thresholded for noise reduction pre- or post-averaging.

In order to synchronize timing of a receiver device with an OFDM broadcast signal including a TDM pilot, the location in time of the pilot within the broadcast signal may be determined. This may be accomplished by an FAP/LAP search algorithm. As discussed above, a first set of inputs to the FAP/LAP search algorithm may be: (1) channel estimate, (2) noise threshold $T_{avg}$, and (3) previous FAP location $FAP_{past}$. A second set of inputs or parameters which may influence the outcome may include: (i) window-length $N_w$, (ii) sensitivity coefficients $\epsilon_b$, and $\epsilon_f$, and (iii) causal length assumed in channel estimate $N_{cau}$. Values in the first set of inputs are expected to change during the operation of the receiver device, such as when the device moves within a coverage area. These values may be adapted from update to update. Conversely, the second set of inputs or parameters may not be expected to be changed frequently in response to the external environment during the operation, and instead are values which may be set by the manufacturer and self-adapted only sporadically. The outputs of an FAP/LAP search algorithm may be the positions in time of the first arriving path (FAP) and last arriving path (LAP) corresponding to the channel estimate in question, measured in terms of the sample index n. Using the FAP and LAP timing, embodiments can calculate an offset or correction that can be applied to correct the OFDM symbol timing.

Figure 9A:
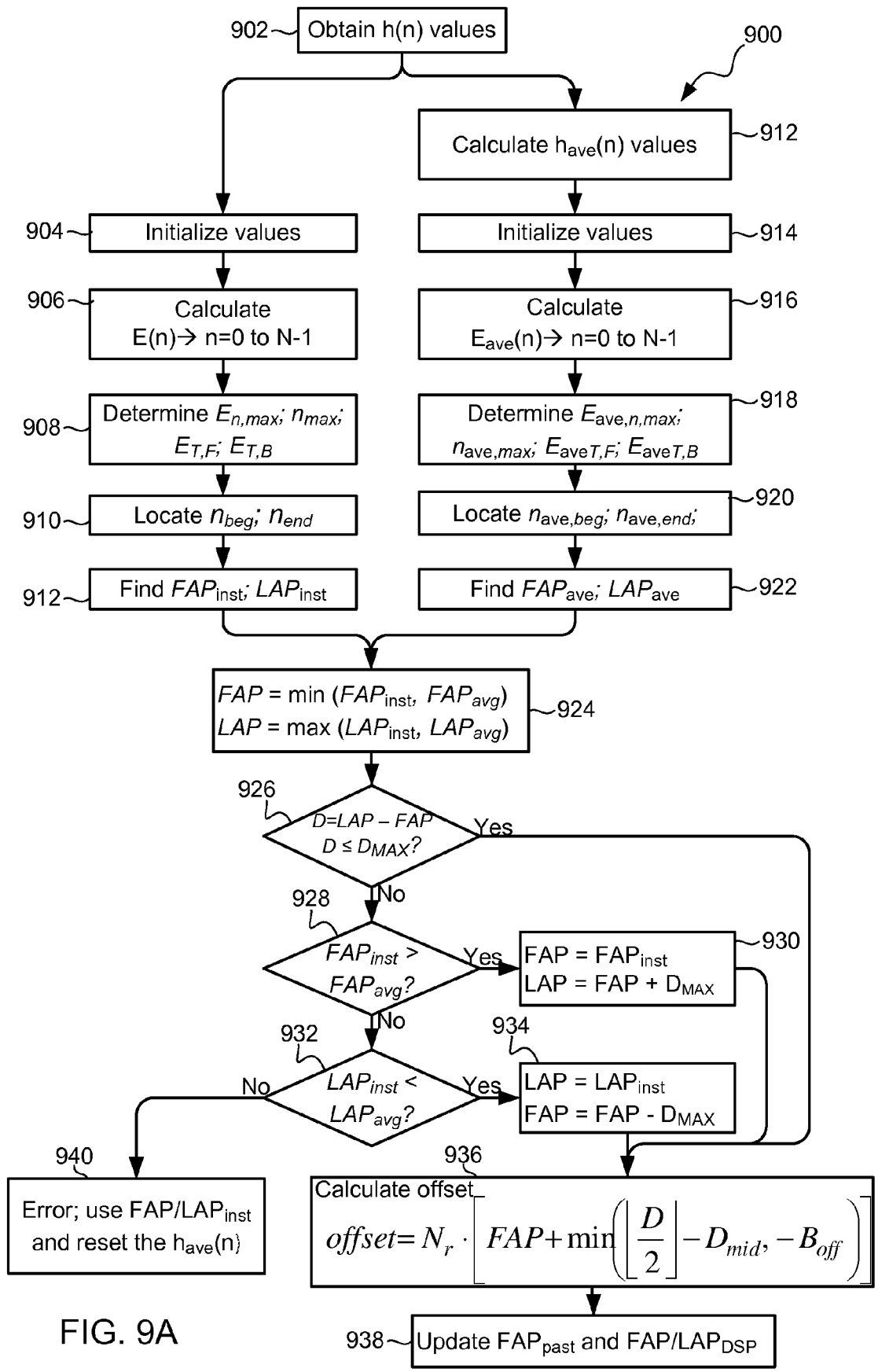
FIGS. 9A and 9B are process flow diagrams pertaining to fine timing acquisition in the presence of DSP enhancements.

FIG. 9A illustrates an embodiment FAP/LAP search method 900 for locating the TDM pilot-2 signal, as well as computing the offset to apply to timing synchronization based upon obtained channel estimate values across a detection window. In method 900 in step 902 the instantaneous channel estimates h(n) are obtained from the digital signal processor for the N taps spanning the length of the detection window. The instantaneous channel estimates may the be processed in two paths simultaneously to determine the instantaneous FAP and LAP (i.e., $FAP_{inst}$ and $LAP_{inst}$) in a first path (steps 904-912), and the average FAP and LAP (i.e., $FAP_{avg}$; and $LAP_{avg}$) based upon averaged channel estimates $h_{avg}(n)$ in a second path (steps 912-922). These four numbers, $FAP_{inst}$, $LAP_{inst}$, $FAP_{avg}$, and $LAP_{avg}$, may be reported to the final stage of the offset computation (steps 924-938). It should be noted that the instantaneous channel estimate may have already been thresholded before the sorting process, so the "implicit thresholding" step may be skipped.

To determine the instantaneous FAP and LAP (i.e., $FAP_{inst}$ and $LAP_{inst}$), the algorithm may initialize the relevant variables and buffers that are used for averaging and search in step 904. As part of the initialization process in step 904, the $E_n$ buffer may be initialized to zero, and the position counter n set to zero. Also, the values $n_{beg}$ and $n_{end}$ should be initialized to contain the leading and trailing edge position respectively. Based on the maximum tap of the averaged channel estimate h(n), namely $E_{MAX}$, determine the unsigned threshold $T = E_{MAX}/\delta_T$. The maximum accumulated energy value, $E_{n, MAX}$ and the corresponding position, $n_{MAX}$ may both be initialized to zero. The flags may be set to $found_{beg} = found_{end} = false$. The previous value, $FAP_{past}$, may be stored internally.

With initialization completed, the algorithm may perform two computational passes through the N channel estimate values h(n) spanning the detection window (steps 906-912), the first being an accumulation computation and the second being a search algorithm.

In step 906 of method 900, the channel estimate energies may be accumulated over the detection window of length $N_w$, to form an accumulated energy profile, which may be contained in the buffer $E_n$, if length N=256. The outcome of this accumulation process may be the accumulated energies and locations of their maximum values within the detection window. This accumulation step may be accomplished using the following example algorithm.

---

For $0 \leq n \leq N_w$, the following is performed:
    a) e = h(n); if e > $T_{inst}$, do: $E_0 = E_0 + e$ (saturated back to 16 bit);
For $1 \leq n \leq N - 1$, the following is performed:
    a) e = h($[N_w - 1 + n]_{modN}$); if e > $T_{inst}$, do: $E_n = E_{n-1}$ +e (saturate back to 16 bits);
    b) e = h(n − 1); if e > $T_{inst}$, do: $E_n = E_n - e$ (saturate back to 16 bits);
    c) if $E_n > E_{n,MAX}$, set $E_{n, MAX} = E_n$ and $n_{MAX} = n$.

---

After the accumulation pass has been completed, the algorithm may use $E_{n, MAX}$ to set the forward and backward thresholds: $E_{T,F} = E_{n, MAX} \cdot (1 - \epsilon_f)$, and $E_{T,B} = E_{n, MAX} \cdot (1 - \epsilon_b)$ in step 908 of method 900. Such thresholds may be retained as 16 bits unsigned data.

In step 910, the second computational pass through the data to search for the FAP and LAP may be accomplished in two parts: first, a backward search to locate the leading edge of the TDM pilot-2 signal identified by the variable $n_{beg}$; and, second, a forward search to locate the trailing edge of the TDM pilot-2 signal identified by the variable $n_{end}$. Starting with the initialized values $found_{beg} = found_{end} = false$, the search for the FAP and LAP may be accomplished using the following algorithm example:

---

Backward search:
For $1 \leq k \leq N_w$, n = $[n_{MAX} - k]_{modNc}$ (decreasing index), do the following:
    a) if ($found_{beg}$ = false, and $E_n < E_{T,B}$), do: $n_{beg}$ = n, $found_{beg}$ = true;
    b) else if ($found_{beg}$ = true, and $E_n \geq E_{T,B}$), do: $found_{beg}$ = false.
Forward search:
For $1 \leq k \leq N_w$, n = $[n_{MAX} + k]_{modNc}$ (increasing index), do the following:
    a) if ($found_{end}$ = false, and $E_n < E_{T,f}$), do: $n_{end}$ = n − 1, $found_{end}$ = true;
    b) else if ($found_{end}$ = true, and $E_n \geq E_{T,f}$), do: $found_{end}$ = false.

---

At the completion of step 910, both $n_{beg}$ and $n_{end}$ should contain valid values, and both binary flags should be set to true. If the latter is not the case, timing offset value should be simply set to zero, and further operations should be aborted. It should be noted that even in the corner case when k=$N_c/2$, it may theoretically be impossible for the boundary point n=$[n_{MAX}+N_c/2]_{modNc}$ to be declared both as the beginning and ending of the flat zone.

In step 912, output parameters FAP and LAP are determined tied to corresponding channel locations. Based on $FAP_{past}$ and $N_{cau}$, the algorithm may find the boundary between the search regions as: $N_b = FAP_{past} + N_{cau}$. The FAP and LAP values may then be found using the following algorithm example:

--- if $n_{end} > N_b$ and $n_{beg} \geq n_{end} - N_w$, set FAP = $n_{end} - N_c$ and
    LAP = $n_{beg} + N_W - N_C$;
else, if $n_{end} \leq N_b$ and $n_{beg} \geq N_C + n_{end} - N_W$, set LAP = $n_{beg} + N_W - N_C$ and FAP = $n_{end}$;
else, if $n_{end} \leq N_b$ and $n_{beg} \leq n_{end}$, set LAP = $n_{beg} + N_W$ and FAP = $n_{end}$;
else, set FAP = LAP = $FAP_{past}$.

---

As a result of step 912, the algorithm has identified the location and time of the first arriving path and the last arriving path based upon the instantaneous channel estimate values. This information can then be used to determine the delay spread D in determination step 924, which may be used to determine how the offset will be calculated as described more fully below.

As mentioned above, a similar process may be accomplished in parallel for determining the average FAP and LAP values. The methods used for calculating the average FAP and LAP values may be similar to those of calculating the instantaneous values except that the average channel estimate values are used as the input data. To determine the average FM and LAP (i.e., $FAP_{ave}$ and $LAP_{ave}$), the algorithm calculates the average channel estimate values $h_{avg}(n)$ in step 913. As discussed above, this may be accomplished by using the instantaneous channel estimate values and the previous average channel estimate values as inputs to Eq. 1, which outputs updated channel estimate values $h_{avg}(n)$ for each increment n.

In step 914 of method 900, the algorithm may initialize the relevant variables and buffers that are used for averaging and search process similar to the initialization is performed in step 904. As part of the initialization process in step 914, the $E_n$ buffer may be initialized to zero, and the position counter n set to zero. Also, the values $n_{ave,beg}$ and $n_{ave,end}$ should be initialized to contain the leading and trailing edge position respectively. Based on the maximum tap of the averaged channel estimate $h_{avg}(n)$, namely $E_{MAX}$, determine the unsigned threshold $T_{avg} = E_{MAX}/\epsilon_T$. The maximum accumulated energy value, $E_{n, MAX}$ and the corresponding position, $n_{MAX}$ may both be initialized to zero. The flags may be set to $found_{beg} = found_{end} = false$. The previous value, $FAP_{past}$, may be stored internally.

With initialization completed, the algorithm may perform two computational passes through the N average channel estimate values $h_{avg}(n)$ spanning the detection window (steps 916-922), the first being an accumulation computation and the second being a search algorithm.

In step 916, the average channel estimate energies may be accumulated over the detection window of length $N_w$, to form an accumulated average energy profile, which may be contained in the buffer $E_n$, if length N=256. The outcome of this accumulation process may be the accumulated energies and locations of their maximum values within the detection window. This accumulation step may be accomplished using the following example algorithm.

```
For 0 ≤ n ≤ N_w, the following is performed:
    a) e = h_avg(n); if e > T_avg, do: E_0 = E_0 + e (saturated back to 16 bit);
For 1 ≤ n ≤ N − 1, the following is performed:
    a) e = h_avg([N_w − 1 + n]_modN); if e > T_avg, do: E_n = E_{n−1} +e (saturate
back to 16 bits);
    b) e = h_avg(n − 1); if e > T_avg, do: E_n = E_n − e (saturate back to 16
    bits);
    c) if E_n > E_{n,MAX}, set E_{n,MAX} = E_n and n_MAX = n.
```

After the accumulation pass has been completed, the algorithm may use $E_{n,MAX}$ to set the forward and backward thresholds: $E_{T,F}=E_{n,MAX}\cdot(1-\epsilon_f)$, and $E_{T,B}=E_{n,MAX}\cdot(1-\epsilon_b)$ in step 918 of method 900. Such thresholds may be retained as 16 bits unsigned data.

In step 920, the second computational pass through the data to search for the average FAP and LAP values may be accomplished in two parts: first, a backward search to locate the leading edge of the TDM pilot-2 signal identified by the variable $n_{beg}$; and, second, a forward search to locate the trailing edge of the TDM pilot-2 signal identified by the variable $n_{end}$. Starting with the initialized values found$_{beg}$=found$_{end}$=false, the search for the average FAP and LAP may be accomplished using the following algorithm example:

```
Backward search:
For 1 ≤ k ≤ N_w, n = [n_MAX − k]_modNc (decreasing index), do the
following:
    a) if (found_beg = false, and E_n < E_{T,B}), do: n_beg = n, found_beg = true;
    b) else if (found_beg = true, and E_n ≥ E_{T,B}), do: found_beg = false.
Forward search:
For 1 ≤ k ≤ N_w, n = [n_MAX + k]_modNc (increasing index), do the
following:
    a) if (found_end = false, and E_n < E_{T,f}), do: n_end = n − 1, found_end =
    true;
    b) else if (found_end = true, and E_n ≥ E_{T,f}), do: found_end = false, .
```

At the completion of step 920, both $n_{beg}$ and $n_{end}$ should contain valid values, and both binary flags should be set to true. If the latter is not the case, timing offset value should be simply set to zero, and further operations should be aborted. As noted above, even in the corner case when $k=N_C/2$, it may theoretically be impossible for the boundary point $n=[n_{MAX}+N_C/2]_{modNc}$ to be declared both as the beginning and ending of the flat zone.

In step 922, output parameters $FAP_{ave}$ and $LAP_{ave}$ are determined tied to corresponding channel locations. Based on $FAP_{past}$ and $N_{cau}$, the algorithm may find the boundary between the search regions as: $N_b=FAP_{past}+N_{cau}$. The $FAP_{ave}$ and $LAP_{ave}$ values may then be found using the following algorithm example:

```
if n_end > N_b and n_beg ≥ n_end − N_w, set FAP = n_end − N_c and
    LAP = n_beg + N_W − N_C;
else, if n_end ≤ N_b and n_beg ≥ N_C + n_end − N_W, set LAP = n_beg +N_W −
    N_C and FAP = n_end;
else, if n_end ≤ N_b and n_beg ≤ n_end, set LAP = n_beg + N_W and FAP = n_end;
else, set FAP = LAP = FAP_past.
```

As a result of step 922, the algorithm has identified the location and time of the first arriving path and the last arriving path based upon the instantaneous channel estimate values.

At step 924, the FAP is set equal to the lesser of the instantaneous FAP and the average FAP, and the LAP is set equal to the greater of the instantaneous LAPD and the average LAP in step 926. In other words:

$$FAP=\min(FAP_{inst}, FAP_{avg}); \text{ and } LAP=\max(LA_{inst}, LAP_{avg}).$$

This information can then be used to determine the delay spread D in determination step 924, which may be used to determine how the offset will be calculated as described more fully below.

The information determined above can be used to determine the delay spread D in determination step 924, which may be used to determine how the offset will be calculated as described more fully below. Note that the distance between FAP and LAP, i.e., delay spread D, may never exceed $D_{MAX}=N_W$. Using the determined values for $FAP_{inst}$, $LAP_{inst}$, $FAP_{avg}$, $LAP_{avg}$, as well as parameter $D_{mid}$, a computational unit for offset calculation may determine the next offset. $D_{mid}$ is a pre-determined value which is may be provisioned on the device. The $D_{mid}$ value determines the point in the channel estimate around which the short channels will be centered after the process of timing synchronization. This value may be chosen taking a few considerations into account, including that $D_{mid}$ should be somewhere between $B_{off}$ and $(N_{CP}-B_{off})/2$. This value helps to keep the whole channel inside the CP. Setting $D_{mid}$ closer to $B_{off}$ implies that the channel is forced to start at $B_{off}$ and disregard centering. This is a good option if there is reason to believe signal content after FAP can be expected in the future. Setting the $D_{mid}$ closer to $(N_{CP}-B_{off})/2$ implies that the channel is allowed to grow around the middle of CP. This latter value may be a better option unless signal content can be expected prior to FAP. In practice, since "early signal content" unaccounted for can create more problems, $D_{mid}$ may be chosen somewhere midway between the two extremes, or roughly around 25% of the CP.

To determine the next offset, composite channel content boundaries are determined as follows. If the delay spread D is less than or equal to the maximum acceptable delay spread $D_{MAX}$ (i.e., determination step 926="Yes"), the FAP and LAP values may be used to calculate the offset in step 936, which is described below.

If the delay spread D is greater than a maximum acceptable delay spread $DS_{MAX}$ (i.e., determination step 924="No"), the algorithm may determine whether the instantaneous FAP is less than the average FAP in determination step 928. If the instantaneous FAP is less than the average FAP (i.e., determination step 928="Yes"), FAP may be set equal to the instantaneous FAP, and the LAP may be set equal to the FAP plus the maximum acceptable delay spread $D_{MAX}$ in step 930. In other words:

$$\text{If } FAP_{inst} < FAP_{avg} => FAP=FAP_{inst}, LAP=FAP+D_{MAX}.$$

If the instantaneous FAP is less than the average FAP (i.e., determination step 928="No"), the algorithm may determine whether the instantaneous LAPD is less than the average LAP in determination step 932. If the average LAP exceeds the instantaneous LAP (i.e., determination step 932="Yes"), LAP may be set equal to the instantaneous LAP and the FAP may be set equal to the difference between the FAP and the maximum acceptable delay spread $D_{MAX}$ in step 934. In other words:

$$\text{If } LAP_{inst} > LAP_{avg} => LAP=LAP_{inst}, FAP=LAP-D_{MAX}.$$

If the average LAP is less than the instantaneous LAP (i.e., determination step 932="No"), this may indicate an error situation, so LAP may be set to the instantaneous LAP (i.e., $LAP_{inst}$) and FAP may be set to the instantaneous FAP (i.e., $FAP_{inst}$) in step 940. This error condition should never happen in normal condition as that would imply that either the instantaneous or the average DS is greater than the maximum delay spread ($DS_{max}$), which should not happen if the implementation is correct.

With the FAP and LAP values determined, the algorithm then can calculate the appropriate offset value by using the values in the calculation given by Eq. 2 as follows:

$$\text{offset} = N_r \cdot \left[ FAP + \left\lfloor \frac{D}{2} \right\rfloor - D_{mid} \right] \qquad \text{Eq. 2}$$

In Eq. 2, $N_r$ is the channel estimate compression ratio, as the time domain channel estimate obtained using TDM pilot 2 may sometimes be "compressed" by combining two or more consecutive channel taps. This combination of consecutive channel taps may be done by simple averaging or addition, as all the values of channel taps in time domain are non-negative numbers. Compressed time domain channel estimates can then be stored and processed inside firmware, software, or other external device more efficiently, without much loss in time-domain granularity. An important observation is that the offset applied to OFDM symbol timing may always be a multiple of $N_r$.

It should be noted that it may be possible that a situation could arise in which Eq. 2 may result in an offset value which, if applied, would lead to channel content spilling beyond the zero location, i.e., FAP (future symbols)<0. In order to avoid this scenario, in an embodiment, another programmable parameter may be introduced, namely a minimum back-off value, $B_{off}$. This parameter represents the minimum (positive) value (expressed in the number of compressed chips) where the channel beginning may be placed in the subsequent OFDM symbols. In order to apply this limitation, Eq. 2 is modified as follows, which is used to calculate the appropriate offset value in step 936:

$$\text{offset} = N_r \cdot \left[ FAP + \min\left( \left\lfloor \frac{D}{2} \right\rfloor - D_{mid}, -B_{off} \right) \right] \qquad \text{Eq. 3}$$

Finally, to allow for the calculation of timing offsets that are greater than the cyclic prefix in an OFDM system, or some other programmable value offset$_{MAX}$, representing the maximum timing offset which can be applied at the beginning of a single OFDM symbol, the offset calculated by formula Eq. 3 may further be divided into two or more parts, and applied in steps. In other words, $$\text{offset}_1 = \min(\text{offset}, \text{offset}_{MAX}); \text{offset}_2 = \text{offset} - \text{offset}_1. \qquad \text{Eq. 4}$$

It should be noted that the total TDM pilot-2 offset may represent a combination of the instantaneous offset applied by hardware as a response to TDM pilot-2 processing, and the composite offset correction, applied soon after TDM pilot-2 channel averaging and the FAP/LAP search.

As the foregoing algorithms shows, the previous (i.e., past) FAP $FAP_{past}$ is an important factor in computing the next values of FAP, and LAP, as well as in computing the timing offset as described below. Therefore, the $FAP_{past}$ value is kept current throughout normal mode of operations where timing offsets from both firmware (software) and from hardware could be applied. In an embodiment, a simple rule of thumb is to make necessary adjustments to $FAP_{past}$ in order to keep it current at the moment when the value is being used. In practice this means that $FAP_{past}$ may be updated in step 938 of method 900, shortly after the composite offset correction is calculated and about to be applied to hardware. The modification to the internal value is as following:

$$FAP_{past} = FAP_{DSP} - \text{accum\_offset, and } FAP_{DSP} = \text{total\_TDM2\_offset}. \qquad \text{Eq. 5}$$

In Eq. 5, accum\_offset is a total timing offset applied in hardware between two instances of TDM pilot-2 channel averaging. The value $FAP_{DSP}$ may be the current internal firmware (software) notion of the first arriving path of the channel. As can be seen, this value itself may need to be updated based on the total TDM pilot-2 offset in the previous superframe.

Figure 9B:
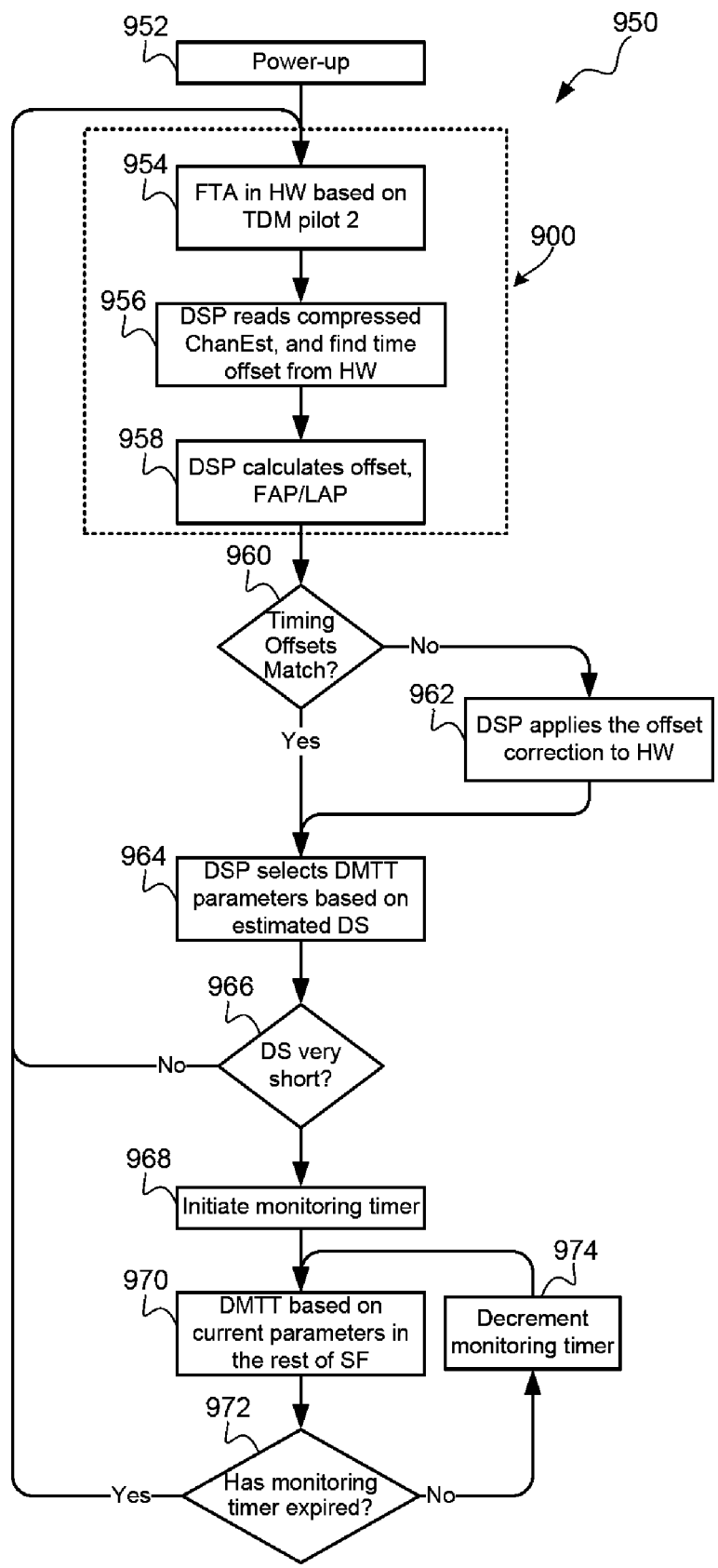

Once the offset is calculated in step 936, it may be used in the timing synchronization process as shown in example method 950 illustrated in FIG. 9B. FIG. 9B illustrates how the method 900 described above is implemented as part of the overall timing synchronization method 950. At the start of fine timing acquisition in method 950, such as may occur following power up of the receiver circuitry in step 952, the receiver device hardware and software performs the processes of method 900 by accomplishing the fine timing acquisition in hardware based on the instantaneous TDM pilot-2 symbol (i.e., $FAP_{inst}$ and $LAP_{inst}$), step 954, calculating the average timing acquisition (i.e., $FAP_{ave}$ and $LAP_{ave}$) such as by a DSP reading compressed channel estimates, step 956, and calculating a timing offset based on those results, step 958. In decision step 960, a DSP (or processor or other decoding circuit) may compare the instantaneous timing offset value with the offset value based upon the average timing acquisition to determine if they match. If the instantaneous timing offset differs from the average timing offset by more than a threshold value (i.e., decision step 960="No"), the DSP (or other circuit) may apply the offset correction calculated in step 936 described above with reference to FIG. 9A to the instantaneous timing offset. As discussed above, applying the offset correction to the instantaneous timing offset in step 962 can compensate for sudden changes in timing that may be caused by a sudden fade of the first arriving signal, so that fine timing synchronization is not thrown off by such events. The corrected timing synchronization is then used in DMTT to decode symbols. If the instantaneous timing offset matches the average timing offset within a threshold value (i.e., decision step 960="Yes"), then no correction is required and the DSP may use the instantaneous synchronization timing.

In step 964 the DSP selects the parameters used for DMTT based upon the estimated delay spread DS calculated in step 924 of method 900. Such DMTT parameters are well known and are used as part of identifying the most likely symbol based on timing information. In decision step 966, the DSP may determine whether the delay spread (DS) is short or long. If the delay spread as long (i.e., decision step 966="No"), as may occur in situations where there is a large amount of multipath signals (e.g., in a city or mountainous location), then it is important to regularly repeat the process of fine timing acquisition using the TDM pilot-2, so the DSP may return to step 954 in the next superframe to repeat the process described above. However, if the delay spread is very short (i.e., decision step 966="Yes"), as may occur in locations of little or no multipath signals, the DSP may decode a number of superframe's worth of data without re-performing the fine timing acquisition since it is unlikely that the timing parameters will change rapidly. Thus, the DSP (or other circuit) may initiate a monitoring timer in step 968, and decode symbols using the DMTT parameters set in step 964 for all symbols in the superframe in step 970 until it determines that the monitoring timer has expired in decision step 972. The monitoring timer may be sent to a number of seconds, such as 10 to 15 seconds, which may depend upon the length of the delay spread (e.g., the shorter the delay spread the longer the monitoring timer setting). If the monitoring timer has not expired (i.e., decision step 972="No"), the DSP or a timing circuit made decremented the monitoring timer at step 974, and continue to decode symbols using the current DMTT parameters in step 970. When the monitoring timer expires i.e., decision step 972="Yes"), the DSP may return to step 954 in the next superframe to repeat the fine timing acquisition process described above. By using current DMTT parameters and performing the fine timing acquisition process intermittently when the delay spread a short can save battery power required for the processing of the TDM pilot-2 symbols.

Figure 10:
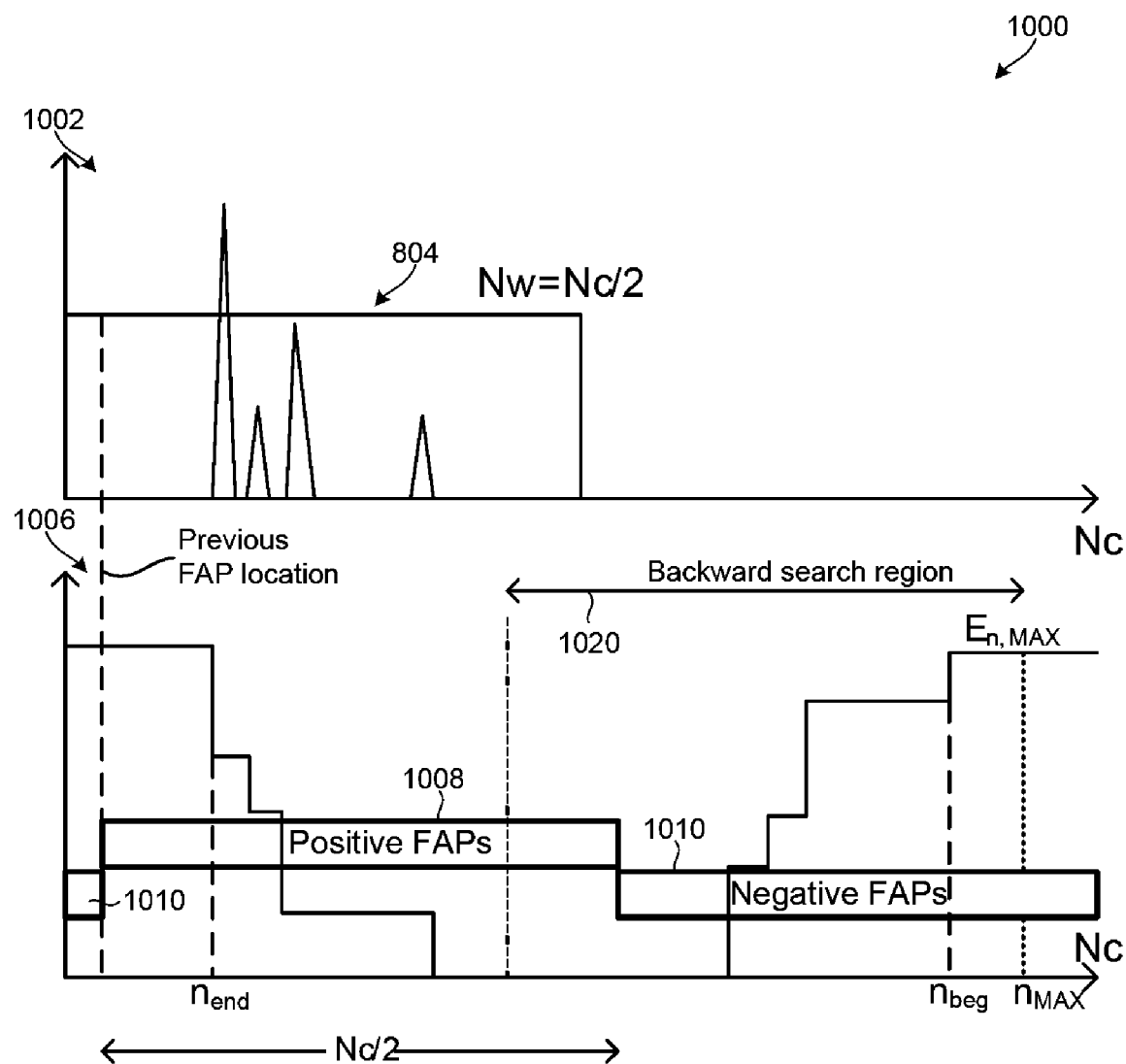
FIG. 10 illustrates an exemplary first arriving path/last arriving path search algorithm.

FIG. 10 illustrates an example of channel estimates and accumulated energy as may be calculated by the foregoing algorithms. FIG. 10 shows a representative TDM pilot-2 channel estimate 1002 including four signal replicas arriving at different times (measured in numbers of chips) encompassed by a detection window 804. In this example, the length of the detection window $N_w$ is one half of $N_c$. FIG. 10 also shows a representation of the signal energy accumulated within the detection window 1006 for different starting window locations n. The figure illustrates how previous FAP location information is used as a guide from which the new FAP is being searched. The previous FAP location is in essence the point zero of the reference system for new FAP locations, so that FAPs detected to the right of the previous FAP location are considered as representations of positive shifts in channel, and FAPs detected to the left of the previous FAP location are considered as representations of negative shifts in channel. In the example shown in the figure, both positive and negative search regions have the same length, although in other embodiments the positive region may be chosen to be longer if the field data suggest such channel shifts are more pronounced. The figure also illustrates the second computation step 920 of the FAP/LAP search algorithm, when the position of the maximum detected accumulated energy is used as a starting location for forward and backward searches. These two searches may be done in parallel and result in finding the positions $n_{beg}$ and $n_{end}$, namely the leading and trailing edges of the flat zone. These values are then routinely translated into FAP/LAP values.

Figure 11:
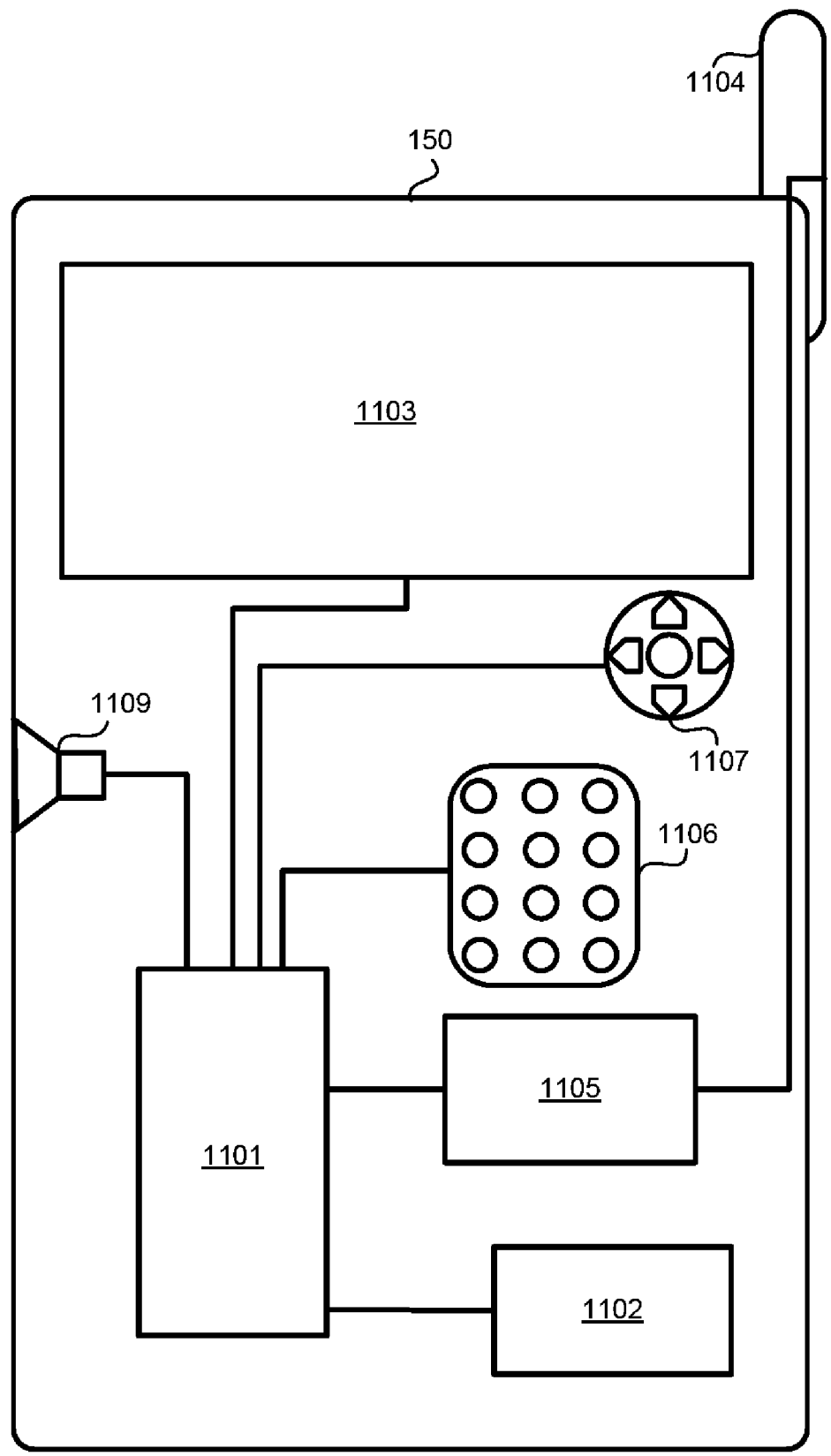
FIG. 11 is a component block diagram of a mobile device suitable for use in an embodiment.

Typical wireless receiver 150 suitable for use with the various embodiments will have in common the components illustrated in FIG. 11. For example, an exemplary wireless receiver 150 may include a processor 1101 coupled to internal memory 1102, a display 1103, and to a speaker 1109. Additionally, the wireless receiver 150 may have an antenna 1104 for sending and receiving electromagnetic radiation that is connected to a wireless data link and/or cellular telephone transceiver 1105 coupled to the processor 1101. In some implementations, the transceiver 1105 and portions of the processor 1101 and memory 1102 used for cellular telephone communications are collectively referred to as the air interface since it provides a data interface via a wireless data link. Wireless receiver 150 typically also includes a key pad 1106 or miniature keyboard and menu selection buttons or rocker switches 1107 for receiving user inputs.

The processor 1101 may be any programmable microprocessor, microcomputer or multiple processor chip or chips that can be configured by software instructions (applications) to perform a variety of functions, including the functions of the various embodiments described herein. In some mobile devices, multiple processors 1101 may be provided, such as one processor dedicated to wireless communication functions and one processor dedicated to running other applications. Typically, software applications may be stored in the internal memory 1102 before they are accessed and loaded into the processor 1101. In some mobile devices, the processor 1101 may include internal memory sufficient to store the application software instructions. In many wireless receivers 150, the internal memory 1102 may be a volatile or nonvolatile memory, such as flash memory, or a mixture of both. For the purposes of this description, a general reference to memory refers to all memory accessible by the processor 1101, including internal memory 1102, removable memory plugged into the wireless receiver 150, and memory within the processor 1101 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of timing acquisition in a wireless communication system, comprising:
    receiving time domain multiplex (TDM) pilot symbols;
    obtaining instantaneous time-domain TDM pilot channel estimates based on the received TDM pilot symbols;
    time-weighted averaging the obtained instantaneous TDM pilot based channel estimates over time; and
    performing timing acquisition and delay spread estimation based on the instantaneous TDM pilot channel estimates and the time-weighted average TDM pilot channel estimates.

2. The method of claim 1, wherein the communication system broadcasts orthogonal frequency domain multiplexed (OFDM) symbols including TDM pilot-1 and TDM pilot-2 symbols, and the TDM pilot symbols for which channel estimates are obtained are the TDM pilot-2 symbols.

3. The method of claim 1, wherein the TDM pilot is acquired periodically to assist timing synchronization during data decoding.

4. The method of claim 3, wherein the timing acquisition is used to provide initial robust symbol timing for data mode time tracking, and the estimated delay spread is used to adjust timing parameters used in a data mode time tracking algorithm.

5. The method of claim 1, wherein time-weighted averaging the obtained instantaneous TDM pilot based channel estimates over time comprises calculating for each of a plurality of channel estimates an average channel estimate value as a sum of a product of a previous average channel estimate and a first coefficient plus a product of an instantaneous channel estimate and a second coefficient.

6. The method of claim 1, further comprising:
    determining an instantaneous first arriving path ($FAP_{inst}$) time based upon the instantaneous TDM pilot channel estimates;
    determining an instantaneous last arriving path ($LAP_{inst}$) time based upon the instantaneous TDM pilot channel estimates;
    determining an average first arriving path ($FAP_{ave}$) time based upon the time-weighted average TDM pilot channel estimates; and
    determining an average last arriving path ($LAP_{ave}$) time based upon the time-weighted average TDM pilot channel estimates,
    wherein performing timing acquisition and delay spread estimation based on the instantaneous TDM pilot channel estimates and the time-weighted average TDM pilot channel estimates comprises performing timing acquisition and delay spread estimation based on the determined $FAP_{inst}$, $LAP_{inst}$, $FAP_{ave}$ and $LAP_{ave}$ values.

7. The method of claim 6, further comprising:
    selecting a lesser of the $FAP_{inst}$ and $FAP_{ave}$ as a first arriving path time and selecting a greater of the $LAP_{inst}$ and $LAP_{ave}$ as the first arriving path time;
    calculating a delay spread as a difference between a last arriving path time and a first arriving path time;
    determining whether the calculated delay spread exceeds a maximum allowable delay spread;
    selecting the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and
    selecting the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

8. The method of claim 7, further comprising calculating an offset for use in performing timing acquisition according using the following equation $$\text{offset} = N_r \cdot \left[ FAP + \min\left(\left\lfloor \frac{D}{2} \right\rfloor - D_{mid}, -B_{off}\right) \right]$$

wherein:
    $N_r$ is a channel estimate compression ratio;
    FAP is the selected first arriving path time;
    D is the calculated delay spread; and
    $B_{off}$ is a minimum back-off value.

9. The method of claim 8, wherein the calculated offset is applied in two steps as a first offset and a second offset, the first offset being the lesser of the calculated offset and a predetermined maximum, and the second offset being equal to the difference between the calculated offset and the first offset.

10. The method of claim 5, further comprising adjusting the first and second coefficients for channel estimation averaging based upon an observed condition.

11. The method of claim 10, wherein the observed condition is selected from an observed channel delay spread, a speed of movement, and observed trends in determined timing acquisition offset.

12. A wireless communication device, comprising:
a processor;
a memory coupled to the processor; and
a wireless receiver circuit coupled to the processor,
wherein the processor is configured with processor-executable instructions to perform operations comprising:
receiving time domain multiplex (TDM) pilot symbols;
obtaining instantaneous time-domain TDM pilot channel estimates based on the received TDM pilot symbols;
time-weighted averaging the obtained instantaneous TDM pilot based channel estimates over time; and
performing timing acquisition and delay spread estimation based on the instantaneous TDM pilot channel estimates and the time-weighted average TDM pilot channel estimates.

13. The wireless communication device of claim 12, wherein the wireless receiver circuit is configured to receive orthogonal frequency domain multiplexed (OFDM) symbols including TDM pilot-1 and TDM pilot-2 symbols, and the TDM pilot symbols for which channel estimates are obtained are the TDM pilot-2 symbols.

14. The wireless communication device of claim 12, wherein the processor is configured with processor-executable instructions such that the TDM pilot is acquired periodically to assist timing synchronization during data decoding.

15. The wireless communication device of claim 14, wherein the processor is configured with processor-executable instructions to perform operations further comprising using the timing acquisition to provide initial robust symbol timing for data mode time tracking, and using the estimated delay spread to adjust timing parameters used in a data mode time tracking algorithm.

16. The wireless communication device of claim 12, wherein the processor is configured with processor-executable instructions such that time-weighted averaging the obtained instantaneous TDM pilot based channel estimates over time comprises calculating for each of a plurality of channel estimates an average channel estimate value as a sum of a product of a previous average channel estimate and a first coefficient plus a product of an instantaneous channel estimate and a second coefficient.

17. The wireless communication device of claim 12, wherein the processor is configured with processor-executable instructions to perform operations further comprising:
determining an instantaneous first arriving path ($FAP_{inst}$) time based upon the instantaneous TDM pilot channel estimates;
determining an instantaneous last arriving path ($LAP_{inst}$) time based upon the instantaneous TDM pilot channel estimates;
determining an average first arriving path ($FAP_{ave}$) time based upon the time-weighted average TDM pilot channel estimates; and
determining an average last arriving path ($LAP_{ave}$) time based upon the time-weighted average TDM pilot channel estimates,
wherein performing timing acquisition and delay spread estimation based on the instantaneous TDM pilot channel estimates and the time-weighted average TDM pilot channel estimates comprises performing timing acquisition and delay spread estimation based on the determined $FAP_{inst}$, $LAP_{inst}$, $FAP_{ave}$ and $LAP_{ave}$ values.

18. The wireless communication device of claim 17, wherein the processor is configured with processor-executable instructions to perform operations further comprising:
selecting a lesser of the $FAP_{inst}$ and $FAP_{ave}$ as a first arriving path time and selecting a greater of the $LAP_{inst}$ and $LAP_{ave}$ as the first arriving path time;
calculating a delay spread as a difference between a last arriving path time and a first arriving path time;
determining whether the calculated delay spread exceeds a maximum allowable delay spread;
selecting the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and
selecting the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

19. The wireless communication device of claim 18, wherein the processor is configured with processor-executable instructions to perform operations further comprising calculating an offset for use in performing timing acquisition according using the following equation $$\text{offset} = N_r \cdot \left[ FAP + \min\left(\left\lfloor \frac{D}{2} \right\rfloor - D_{mid}, -B_{off}\right) \right]$$

wherein:
$N_r$ is a channel estimate compression ratio;
FAP is the selected first arriving path time;
D is the calculated delay spread; and
$B_{off}$ is a minimum back-off value.

20. The wireless communication device of claim 19, wherein the processor is configured with processor-executable instructions such that the calculated offset is applied in two steps as a first offset and a second offset, the first offset being the lesser of the calculated offset and a predetermined maximum, and the second offset being equal to the difference between the calculated offset and the first offset.

21. The wireless communication device of claim 16, wherein the processor is configured with processor-executable instructions to perform operations further comprising adjusting the first and second coefficients for channel estimation averaging based upon an observed condition.

22. The wireless communication device of claim 21, wherein the processor is configured with processor-executable instructions such that the observed condition is selected from an observed channel delay spread, a speed of movement, and observed trends in determined timing acquisition offset.

23. A wireless communication device, comprising:
means for receiving time domain multiplex (TDM) pilot symbols;
means for obtaining instantaneous time-domain TDM pilot channel estimates based on the received TDM pilot symbols;
means for time-weighted averaging the obtained instantaneous TDM pilot based channel estimates over time; and means for performing timing acquisition and delay spread estimation based on the instantaneous TDM pilot channel estimates and the time-weighted average TDM pilot channel estimates.

24. The wireless communication device of claim 23, means for receiving communication system broadcasts of orthogonal frequency domain multiplexed (OFDM) symbols including TDM pilot-1 and TDM pilot-2 symbols, and the TDM pilot symbols for which channel estimates are obtained are the TDM pilot-2 symbols.

25. The wireless communication device of claim 23, further comprising means for periodically acquiring the TDM pilot to assist timing synchronization during data decoding.

26. The wireless communication device of claim 25, further comprising:
means for using the timing acquisition to provide initial robust symbol timing for data mode time tracking; and
means for using the estimated delay spread to adjust timing parameters used in a data mode time tracking algorithm.

27. The wireless communication device of claim 23, wherein means for time-weighted averaging the obtained instantaneous TDM pilot based channel estimates over time comprises means for calculating for each of a plurality of channel estimates an average channel estimate value as a sum of a product of a previous average channel estimate and a first coefficient plus a product of an instantaneous channel estimate and a second coefficient.

28. The wireless communication device of claim 23, further comprising:
means for determining an instantaneous first arriving path ($FAP_{inst}$) time based upon the instantaneous TDM pilot channel estimates;
means for determining an instantaneous last arriving path ($LAP_{inst}$) time based upon the instantaneous TDM pilot channel estimates;
means for determining an average first arriving path ($FAP_{ave}$) time based upon the time-weighted average TDM pilot channel estimates; and
means for determining an average last arriving path ($LAP_{ave}$) time based upon the time-weighted average TDM pilot channel estimates,
wherein means for performing timing acquisition and delay spread estimation based on the instantaneous TDM pilot channel estimates and the time-weighted average TDM pilot channel estimates comprises means for performing timing acquisition and delay spread estimation based on the determined $FAP_{inst}$, $LAP_{inst}$, $FAP_{ave}$, and $LAP_{ave}$ values.

29. The wireless communication device of claim 28, further comprising:
means for selecting a lesser of the $FAP_{inst}$ and $FAP_{ave}$ as a first arriving path time and selecting a greater of the $LAP_{inst}$ and $LAP_{ave}$ as the first arriving path time;
means for calculating a delay spread as a difference between a last arriving path time and a first arriving path time;
means for determining whether the calculated delay spread exceeds a maximum allowable delay spread;
means for selecting the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and
means for selecting the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

30. The wireless communication device of claim 29, further comprising means for calculating an offset for use in performing timing acquisition according using the following equation $$\text{offset} = N_r \cdot \left[ FAP + \min\left( \left\lfloor \frac{D}{2} \right\rfloor - D_{mid}, -B_{\textit{off}} \right) \right]$$

wherein:
$N_r$ is a channel estimate compression ratio;
FAP is the selected first arriving path time;
D is the calculated delay spread; and
$B_{\textit{off}}$ is a minimum back-off value.

31. The wireless communication device of claim 30, further comprising means for applying the calculated offset in two steps as a first offset and a second offset, the first offset being the lesser of the calculated offset and a predetermined maximum, and the second offset being equal to the difference between the calculated offset and the first offset.

32. The wireless communication device of claim 27, further comprising means for adjusting the first and second coefficients for channel estimation averaging based upon an observed condition.

33. The wireless communication device of claim 32, wherein the observed condition is selected from an observed channel delay spread, a speed of movement, and observed trends in determined timing acquisition offset.

34. A processor-readable storage medium having stored thereon processor-executable instructions configured to cause a processor to perform operations comprising:
receiving time domain multiplex (TDM) pilot symbols;
obtaining instantaneous time-domain TDM pilot channel estimates based on the received TDM pilot symbols;
time-weighted averaging the obtained instantaneous TDM pilot based channel estimates over time; and
performing timing acquisition and delay spread estimation based on the instantaneous TDM pilot channel estimates and the time-weighted average TDM pilot channel estimates.

35. The processor-readable storage medium of claim 34, wherein the stored processor-executable instructions are configured such that the processor processes communication system broadcasts of orthogonal frequency domain multiplexed (OFDM) symbols including TDM pilot-1 and TDM pilot-2 symbols, and the TDM pilot symbols for which channel estimates are obtained are the TDM pilot-2 symbols.

36. The processor-readable storage medium of claim 34, wherein the stored processor-executable instructions are configured to cause a processor to perform operations further comprising periodically acquiring the TDM pilot to assist timing synchronization during data decoding.

37. The processor-readable storage medium of claim 36, wherein the stored processor-executable instructions are configured to cause a processor to perform operations further comprising:
using the timing acquisition to provide initial robust symbol timing for data mode time tracking; and
using the estimated delay spread to adjust timing parameters used in a data mode time tracking algorithm.

38. The processor-readable storage medium of claim 34, wherein the stored processor-executable instructions are configured such that time-weighted averaging the obtained instantaneous TDM pilot based channel estimates over time comprises calculating for each of a plurality of channel estimates an average channel estimate value as a sum of a product of a previous average channel estimate and a first coefficient plus a product of an instantaneous channel estimate and a second coefficient.

39. The processor-readable storage medium of claim 34, wherein the stored processor-executable instructions are configured to cause a processor to perform operations further comprising:
determining an instantaneous first arriving path ($FAP_{inst}$) time based upon the instantaneous TDM pilot channel estimates;
determining an instantaneous last arriving path ($LAP_{inst}$) time based upon the instantaneous TDM pilot channel estimates;
determining an average first arriving path ($FAP_{ave}$) time based upon the time-weighted average TDM pilot channel estimates; and
determining an average last arriving path ($LAP_{ave}$) time based upon the time-weighted average TDM pilot channel estimates,
wherein performing timing acquisition and delay spread estimation based on the instantaneous TDM pilot channel estimates and the time-weighted average TDM pilot channel estimates comprises performing timing acquisition and delay spread estimation based on the determined $FAP_{inst}$, $LAP_{inst}$, $FAP_{ave}$ and $LAP_{ave}$ values.

40. The processor-readable storage medium of claim 39, wherein the stored processor-executable instructions are configured to cause a processor to perform operations further comprising:
selecting a lesser of the $FAP_{inst}$ and $FAP_{ave}$ as a first arriving path time and selecting a greater of the $LAP_{inst}$ and $LAP_{ave}$ as the first arriving path time;
calculating a delay spread as a difference between a last arriving path time and a first arriving path time;
determining whether the calculated delay spread exceeds a maximum allowable delay spread;
selecting the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and
selecting the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

41. The processor-readable storage medium of claim 39, wherein the stored processor-executable instructions are configured to cause a processor to perform operations further comprising calculating an offset for use in performing timing acquisition according using the following equation $$\text{offset} = N_r \cdot \left[ FAP + \min\left( \left\lfloor \frac{D}{2} \right\rfloor - D_{mid}, -B_{off} \right) \right]$$

wherein:
$N_r$ is a channel estimate compression ratio;
FAP is the selected first arriving path time;
D is the calculated delay spread; and
$B_{off}$ is a minimum back-off value.

42. The processor-readable storage medium of claim 41, wherein the stored processor-executable instructions are configured to cause a processor to perform operations further comprising applying the calculated offset in two steps as a first offset and a second offset, the first offset being the lesser of the calculated offset and a predetermined maximum, and the second offset being equal to the difference between the calculated offset and the first offset.

43. The processor-readable storage medium of claim 38, wherein the stored processor-executable instructions are configured to cause a processor to perform operations further comprising adjusting the first and second coefficients for channel estimation averaging based upon an observed condition.

44. The processor-readable storage medium of claim 43 wherein the stored processor-executable instructions are configured such that the observed condition is selected from an observed channel delay spread, a speed of movement, and observed trends in determined timing acquisition offset.

45. A wireless signal processing circuit suitable for use in a wireless communication device, comprising:
a wireless receiver circuit configured to receive an orthogonal frequency domain multiplex signal including Time-Domain Multiplexed (TDM) pilot symbols;
a timing acquisition circuit configured to obtain instantaneous time-domain TDM pilot channel estimates based on the received TDM pilot symbols; and
a logic circuit configured to:
time-weighted average the obtained instantaneous TDM pilot based channel estimates over time; and
perform timing acquisition and delay spread estimation based on the instantaneous TDM pilot channel estimates and the time-weighted average TDM pilot channel estimates.

46. The wireless signal processing circuit of claim 45, wherein the wireless receiver circuit is configured to receive OFDM symbols including TDM pilot-1 and TDM pilot-2 symbols, and the TDM pilot symbols for which channel estimates are obtained are the TDM pilot-2 symbols.

47. The wireless signal processing circuit of claim 45, wherein the logic circuit is configured such that the TDM pilot is acquired periodically to assist timing synchronization during data decoding.

48. The wireless signal processing circuit of claim 47, wherein the logic is further configured to:
use the timing acquisition to provide initial robust symbol timing for data mode time tracking; and
use the estimated delay spread to adjust timing parameters used in a data mode time tracking algorithm.

49. The wireless signal processing circuit of claim 45, wherein the logic circuit is configured such that time-weighted averaging the obtained instantaneous TDM pilot based channel estimates over time comprises calculating for each of a plurality of channel estimates an average channel estimate value as a sum of a product of a previous average channel estimate and a first coefficient plus a product of an instantaneous channel estimate and a second coefficient.

50. The wireless signal processing circuit of claim 45, wherein:
the timing acquisition circuit is further configured to:
determine an instantaneous first arriving path ($FAP_{inst}$) time based upon the instantaneous TDM pilot channel estimates; and determine an instantaneous last arriving path ($LAP_{inst}$) time based upon the instantaneous TDM pilot channel estimates; and the logic circuit is further configured to:
determine an average first arriving path ($FAP_{ave}$) time based upon the time-weighted average TDM pilot channel estimates;
determine an average last arriving path ($LAP_{ave}$) time based upon the time-weighted average TDM pilot channel estimates; and
perform timing acquisition and delay spread estimation based on the instantaneous TDM pilot channel estimates and the time-weighted average TDM pilot channel estimates by performing timing acquisition and delay spread estimation based on the determined $FAP_{inst}$, $LAP_{inst}$, $FAP_{ave}$ and $LAP_{ave}$ values.

51. The wireless signal processing circuit of claim 50, wherein the logic circuit is further configured to:
select a lesser of the $FAP_{inst}$ and $FAP_{ave}$ as a first arriving path time and selecting a greater of the $LAP_{inst}$ and $LAP_{ave}$ as the first arriving path time;
calculate a delay spread as a difference between a last arriving path time and a first arriving path time;
determine whether the calculated delay spread exceeds a maximum allowable delay spread;
select the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and
select the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

52. The wireless signal processing circuit of claim 51, wherein the logic circuit is further configured to calculate an offset for use in performing timing acquisition according using the following equation $$\text{offset} = N_r \cdot \left[ FAP + \min\left(\left\lfloor \frac{D}{2} \right\rfloor - D_{mid}, -B_{off}\right)\right]$$

wherein:
$N_r$ is a channel estimate compression ratio;
FAP is the selected first arriving path time;
D is the calculated delay spread; and
$B_{off}$ is a minimum back-off value.

53. The wireless signal processing circuit of claim 52, wherein the logic circuit is configured such that the calculated offset is applied in two steps as a first offset and a second offset, the first offset being the lesser of the calculated offset and a predetermined maximum, and the second offset being equal to the difference between the calculated offset and the first offset.

54. The wireless signal processing circuit of claim 49, wherein the logic circuit is configured to adjust the first and second coefficients for channel estimation averaging based upon an observed condition.

55. The wireless signal processing circuit of claim 54, wherein the logic circuit is configured such that the observed condition is selected from an observed channel delay spread, a speed of movement, and observed trends in determined timing acquisition offset.

56. A wireless signal processing circuit suitable for use in a wireless communication device, comprising:
means for receiving time domain multiplex (TDM) pilot symbols;
means for obtaining instantaneous time-domain TDM pilot channel estimates based on the received TDM pilot symbols;
means for averaging the obtained instantaneous TDM pilot based channel estimates over time to determine time-averaged TDM pilot channel estimates by summing a first product of a previous averaged TDM pilot based channel estimate and a first coefficient, and a second product of an obtained instantaneous TDM pilot based channel estimate and a second coefficient; and
means for performing timing acquisition and delay spread estimation based on the instantaneous TDM pilot channel estimates and the time-averaged TDM pilot channel estimates.

57. The wireless signal processing circuit of claim 56, means for receiving communication system broadcasts of orthogonal frequency domain multiplexed (OFDM) symbols including TDM pilot-1 and TDM pilot-2 symbols, and the TDM pilot symbols for which channel estimates are obtained are the TDM pilot-2 symbols.

58. The wireless signal processing circuit of claim 56, further comprising means for periodically acquiring the TDM pilot to assist timing synchronization during data decoding.

59. The wireless signal processing circuit of claim 58, further comprising:
means for using the timing acquisition to provide initial robust symbol timing for data mode time tracking; and
means for using the estimated delay spread to adjust timing parameters used in a data mode time tracking algorithm.

60. The wireless signal processing circuit of claim 56, further comprising:
means for determining an instantaneous first arriving path ($FAP_{inst}$) time based upon the instantaneous TDM pilot channel estimates;
means for determining an instantaneous last arriving path ($LAP_{inst}$) time based upon the instantaneous TDM pilot channel estimates;
means for determining an average first arriving path ($FAP_{ave}$) time based upon the instantaneous TDM pilot channel estimates; and
means for determining an average last arriving path ($LAP_{ave}$) time based upon the instantaneous TDM pilot channel estimates,
wherein means for performing timing acquisition and delay spread estimation based on the instantaneous TDM pilot channel estimates and the time-averaged TDM pilot channel estimates comprises means for performing timing acquisition and delay spread estimation based on the determined $FAP_{inst}$, $LAP_{inst}$, $FAP_{ave}$ and $LAP_{ave}$ values.

61. The wireless signal processing circuit of claim 60, further comprising:
means for selecting a lesser of the $FAP_{inst}$ and $FAP_{ave}$ as a first arriving path time and selecting a greater of the $LAP_{inst}$ and $LAP_{ave}$ as the first arriving path time;
means for calculating a delay spread as a difference between a last arriving path time and a first arriving path time;
means for determining whether the calculated delay spread exceeds a maximum allowable delay spread;

means for selecting the $FAP_{inst}$ as the first arriving path time and a sum of a previously calculated last arriving path time plus the maximum allowable delay spread as the last arriving path time when the calculated delay spread exceeds the maximum allowable delay spread and $FAP_{inst}$ is less than $FAP_{ave}$; and means for selecting the $LAP_{inst}$ as the last arriving path time and a difference between a previously calculated first arriving path time and the maximum allowable delay spread as the first arriving path time when the calculated delay spread exceeds the maximum allowable delay spread, $FAP_{inst}$ is less than $FAP_{ave}$ and $LAP_{inst}$ is less than $LAP_{ave}$.

62. The wireless signal processing circuit of claim 61, further comprising means for calculating an offset for use in performing timing acquisition according using the following equation $$\text{offset} = N_r \cdot \left[ FAP + \min\left( \left\lfloor \frac{D}{2} \right\rfloor - D_{mid}, -B_{off} \right) \right]$$

wherein:
$N_r$ is a channel estimate compression ratio;
FAP is the selected first arriving path time;
D is the calculated delay spread; and
$B_{off}$ is a minimum back-off value.

63. The wireless signal processing circuit of claim 62, further comprising means for applying the calculated offset in two steps as a first offset and a second offset, the first offset being the lesser of the calculated offset and a predetermined maximum, and the second offset being equal to the difference between the calculated offset and the first offset.

64. The wireless signal processing circuit of claim 56, further comprising means for adjusting the first and second coefficients for channel estimation averaging based upon an observed condition.

65. The wireless signal processing circuit of claim 64, wherein the observed condition is selected from an observed channel delay spread, a speed of movement, and observed trends in determined timing acquisition offset.

* * * * *